United States Patent
McDaniel et al.

(10) Patent No.: US 12,502,656 B2
(45) Date of Patent: Dec. 23, 2025

(54) METHODS OF CHROMIUM CATALYST ACTIVATION TO REDUCE GELS AND IMPROVE MELT INDEX POTENTIAL

(71) Applicant: Chevron Phillips Chemical Company LP, The Woodlands, TX (US)

(72) Inventors: Max P. McDaniel, Bartlesville, OK (US); Zhihui Gu, Kingwood, TX (US); Ted H. Cymbaluk, Seabrook, TX (US); Anand Ramanathan, Bartlesville, OK (US); Julian Abrego, Pasadena, TX (US); Taryn L Huber, Pasadena, TX (US); David W. Dockter, The Woodlands, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 19/256,405

(22) Filed: Jul. 1, 2025

(65) Prior Publication Data
US 2025/0325965 A1    Oct. 23, 2025

Related U.S. Application Data

(62) Division of application No. 18/650,230, filed on Apr. 30, 2024.

(60) Provisional application No. 63/499,507, filed on May 2, 2023.

(51) Int. Cl.
*B01J 21/08* (2006.01)
*B01J 23/26* (2006.01)
*B01J 37/08* (2006.01)
*B01J 37/14* (2006.01)
*C08F 10/02* (2006.01)

(52) U.S. Cl.
CPC ............... *B01J 23/26* (2013.01); *B01J 21/08* (2013.01); *B01J 37/08* (2013.01); *B01J 37/14* (2013.01); *C08F 10/02* (2013.01); *C08F 2500/07* (2013.01); *C08F 2500/12* (2013.01)

(58) Field of Classification Search
None
See application file for complete search history.

(56) References Cited

U.S. PATENT DOCUMENTS 12,403,454 B2   9/2025   McDaniel

FOREIGN PATENT DOCUMENTS

WO    WO-2005082944 A2 *   9/2005   ................ C08J 5/18

* cited by examiner

*Primary Examiner* — Daniel Berns
(74) *Attorney, Agent, or Firm* — Merchant & Gould P.C.

(57) ABSTRACT

Processes for producing activated chromium catalysts such as titanated chromium/silica catalysts are disclosed, and these processes utilize a multistep process involving exposure to inert and oxidizing atmospheres at specific temperature conditions. The resulting activated chromium catalysts have unexpectedly high melt index potential and can produce ethylene-based polymers with lower gel counts in addition to higher melt indices.

21 Claims, 3 Drawing Sheets

METHODS OF CHROMIUM CATALYST ACTIVATION TO REDUCE GELS AND IMPROVE MELT INDEX POTENTIAL

REFERENCE TO RELATED APPLICATIONS

This application is a divisional application of co-pending U.S. patent application Ser. No. 18/650,230, filed on Apr. 30, 2024, now U.S. Pat. No. 12,403,454, which claims the benefit of U.S. Provisional Patent Application No. 63/499,507, filed on May 2, 2023, the disclosures of which are incorporated herein by reference in their entirety.

FIELD OF THE INVENTION

The present disclosure generally relates to methods for activating supported chromium pre-catalysts and to the use of the activated chromium catalysts to polymerize olefins.

BACKGROUND OF THE INVENTION

Supported chromium pre-catalysts are activated by exposure to an oxygen-containing atmosphere (e.g., air) at elevated temperatures to convert at least a portion of lower valence chromium to an oxidation state of +6 (hexavalent chromium). However, in commercial practice, activation of large quantities of supported chromium catalysts often results in relatively low conversion to Cr(VI), and the resulting activated chromium catalyst often cannot efficiently produce relatively high melt index polymers with low film gel content. It would be beneficial to overcome these deficiencies with alternative methods of catalyst activation and, accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Aspects of this invention are directed to processes for producing an activated (or calcined) chromium catalyst, and such processes can comprise (i) contacting a pre-catalyst with a first inert atmosphere at a temperature T1 in a range from 500° F. to 700° F. (260° C. to 371° C.), wherein the pre-catalyst comprises a silica support and from 0.1 to 5 wt. % chromium, from 0.1 to 10 wt. % titanium, and from 1 to 5 mol nitrogen/mol titanium, (ii) subjecting the pre-catalyst to cycles of a first oxidizing atmosphere at a temperature T2 in a range from 500° F. to 700° F. (260° C. to 371° C.) and a second inert atmosphere at a temperature T3 in a range from 700° F. to 900° F. (371° C. to 482° C.), wherein the first oxidizing atmosphere causes an exothermic increase in temperature from T2 to T3, thereby triggering introduction of the second inert atmosphere which results in cooling to T2, until the exothermic increase in temperature in the first oxidizing atmosphere is less than or equal to 50° F. (28° C.) within 15 min or when heat must be added to maintain T3 in the presence of the first oxidizing atmosphere, (iii) heating the pre-catalyst in a third inert atmosphere to a temperature T4 in a range from 1000° F. to 1400° F. (538° C. to 760° C.) and holding the pre-catalyst at T4 in the third inert atmosphere for a hold time t1 in a range from 1 hr to 15 hr, (iv) cooling the pre-catalyst in a fourth inert atmosphere to a temperature T5 in a range from 900° F. to 1200° F. (482° C. to 649° C.), wherein T5 is less than T4, (v) subjecting the pre-catalyst to a second oxidizing atmosphere at T5 for a hold time t2 in a range from 30 min to 10 hr, (vi) cooling in a third oxidizing atmosphere to a temperature T6 in a range from 500° F. to 700° F. (260° C. to 371° C.) to produce the activated (calcined) chromium catalyst, and (vii) purging the activated (calcined) chromium catalyst in a fifth inert atmosphere at T6 and cooling to ambient temperature.

Olefin polymerization processes also are provided herein. These polymerization processes can comprise (I) performing any process to produce the activated chromium catalyst disclosed herein, and (II) contacting the activated chromium catalyst and an optional co-catalyst with an olefin monomer and an optional olefin comonomer in a polymerization reactor system under polymerization conditions to produce an olefin polymer.

Other aspects of this invention are directed to ethylene polymers (which are typically in the form of pellets or beads) characterized by a high load melt index (HLMI) in a range from 10 to 80 g/10 min and a density in a range from 0.93 to 0.96 g/cm$^3$ (or a melt index (MI) in a range from 0.1 to 1 g/10 min and a density in a range from 0.93 to 0.96 g/cm$^3$). These ethylene polymers can have a total film gel count (or a catalyst particle gel count) of less than or equal to 100 gels per ft$^2$ of 25 micron thick film, wherein film gels encompass a size greater than 200 μm (and caused by catalyst particles for the catalyst particle gel count), and can contain from 150 to 680 ppm silica, from 1.5 to 6.8 ppm chromium, and from 1.5 to 40 ppm titanium.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

Figure 1:
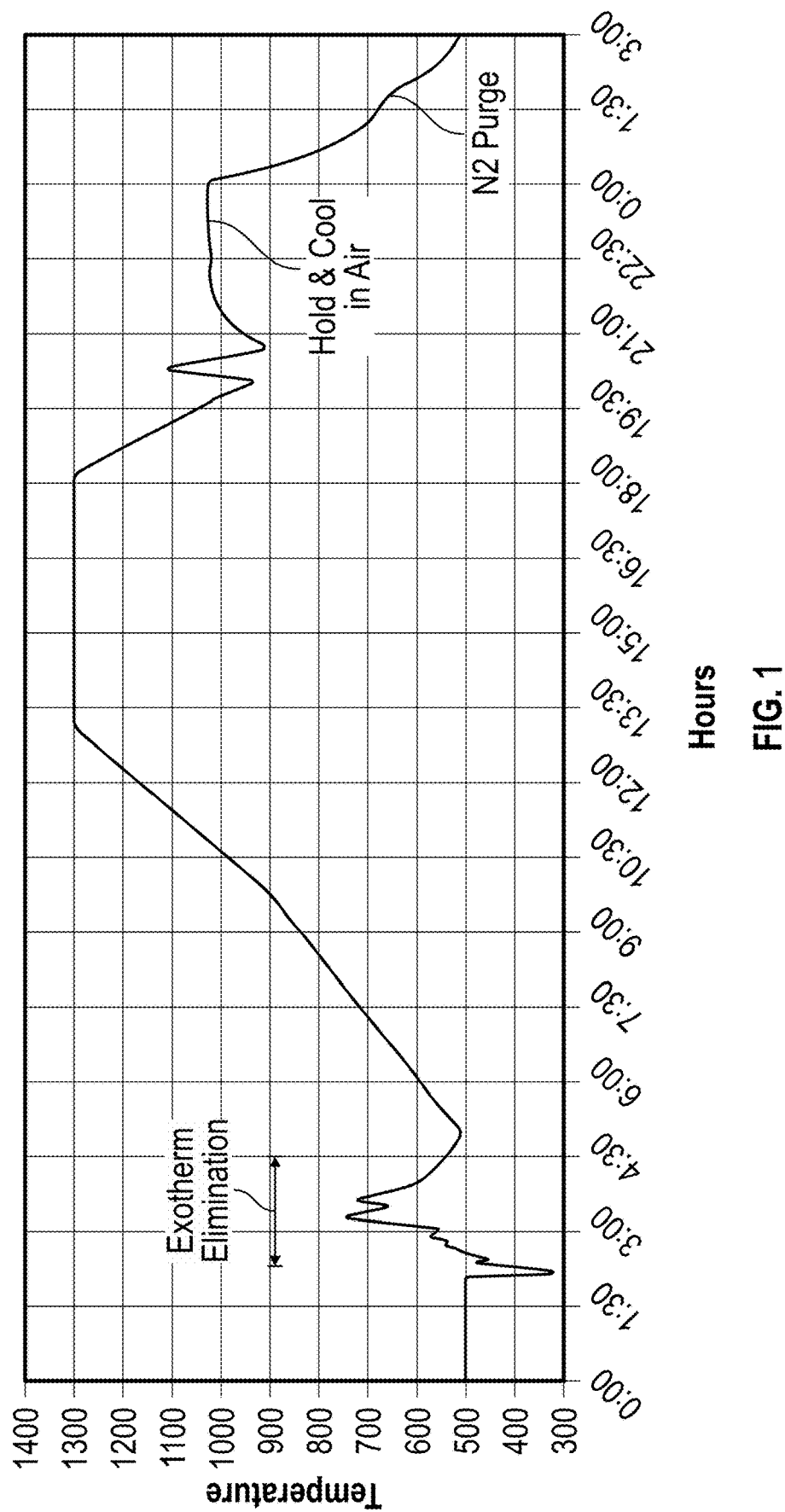
FIG. 1 presents a plot of temperature versus time for a representative method of activation similar to that of Activation Methods F-G.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, compositions, processes, or methods described herein are contemplated with or without explicit description of the particular combination. Additionally, unless explicitly recited otherwise, any aspect or feature disclosed herein can be combined to describe inventive catalysts, compositions, processes, or methods consistent with the present disclosure.

Generally, groups of elements are indicated using the numbering scheme indicated in the version of the periodic table of elements published in *Chemical and Engineering News,* 63 (5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). Non-limiting examples of hydrocarbons include alkanes (linear, branched, and cyclic), alkenes (olefins), and aromatics, among other compounds.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

The terms "contacting" and "subjecting" and the like are used herein to describe catalysts, compositions, processes, and methods in which the materials or components are combined together in any order, in any manner, and for any length of time, unless otherwise specified. For example, the materials or components can be blended, mixed, slurried, dissolved, reacted, treated, impregnated, compounded, fluidized, or otherwise combined in some other manner or by any suitable method or technique.

"BET surface area" as used herein means the surface area as determined by the nitrogen adsorption Brunauer, Emmett, and Teller (BET) method according to ASTM D1993-91, and as described, for example, in Brunauer, S., Emmett, P. H., and Teller, E., "Adsorption of gases in multimolecular layers," J. Am. Chem. Soc., 60, 3, pp. 309-319.

The term "polymer" is used herein generically to include olefin homopolymers, copolymers, terpolymers, and the like, as well as alloys and blends thereof. The term "polymer" also includes impact, block, graft, random, and alternating copolymers. A copolymer is derived from an olefin monomer and one olefin comonomer, while a terpolymer is derived from an olefin monomer and two olefin comonomers. Accordingly, "polymer" encompasses copolymers and terpolymers derived from any olefin monomer and comonomer(s) disclosed herein. Similarly, the scope of the term "polymerization" includes homopolymerization, copolymerization, and terpolymerization. Therefore, an ethylene polymer includes ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an olefin copolymer, such as an ethylene copolymer, can be derived from ethylene and a comonomer, such as 1-butene, 1-hexene, or 1-octene. If the monomer and comonomer are ethylene and 1-hexene, respectively, the resulting polymer can be categorized an as ethylene/1-hexene copolymer. The term "polymer" also includes all possible geometrical configurations, unless stated otherwise, and such configurations can include isotactic, syndiotactic, and random symmetries. Moreover, unless stated otherwise, the term "polymer" also is meant to include all molecular weight polymers.

In this disclosure, while catalysts, compositions, processes, and methods are described in terms of "comprising" various components or steps, the catalysts, compositions, processes, and methods also can "consist essentially of" or "consist of" the various components or steps, unless stated otherwise. The terms "a," "an," and "the" are intended to include plural alternatives, e.g., at least one, unless otherwise specified.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, the oxidizing atmosphere can contain a range of oxygen contents in aspects of this invention. By a disclosure that the oxidizing atmosphere can contain from 1 to 100 vol % oxygen, the intent is to recite that the oxygen content can be any amount in the range and, for example, can include any range or combination of ranges from 1 to 100 vol %, such as from 1 to 50 vol %, from 2 to 30 vol %, from 3 to 25 vol %, or from 4 to 21 vol % oxygen, and so forth. Likewise, all other ranges disclosed herein should be interpreted in a manner similar to this example.

In general, an amount, size, formulation, parameter, range, or other quantity or characteristic is "about" or "approximate" whether or not expressly stated to be such.

Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

The present invention is generally directed to the conversion of lower valence supported chromium pre-catalysts to activated (hexavalent) chromium catalysts, which are subsequently used in olefin polymerization processes.

An objective of the invention is to produce activated chromium catalysts with high Cr(VI) content and catalytic activity. Another objective is to produce activated chromium catalysts with high melt index potential, such that ethylene-based polymers can be produced with lower molecular weights and/or higher melt flow rates. Another objective is to produce activated catalysts with high melt index potential at relative low calcination/activation temperatures. Another objective is to produce activated chromium catalysts that can produce ethylene-based polymers with a broad molecular weight distributions and low levels of long chain branching. Another objective is to produce activated chromium catalysts that can produce ethylene-based polymers with surprisingly low film gel levels. Another objective is to produce activated chromium catalysts that can produce ethylene-based polymers that have improved extrusion processability for a multitude of applications, including blown film, pipe, and blow molded products. These and other benefits are described hereinbelow.

Processes for Activating Chromium Catalysts

Disclosed herein is a process for producing an activated (or calcined) chromium catalyst. This process can comprise (i) contacting a pre-catalyst with a first inert atmosphere at a temperature T1 in a range from 500° F. to 700° F. (260° C. to 371° C.), wherein the pre-catalyst comprises a silica support and from 0.1 to 5 wt. % chromium, from 0.1 to 10 wt. % titanium, and from 1 to 5 mol nitrogen/mol titanium, (ii) subjecting the pre-catalyst to cycles of a first oxidizing atmosphere at a temperature T2 in a range from 500° F. to 700° F. (260° C. to 371° C.) and then a second inert atmosphere at a temperature T3 in a range from 700° F. to 900° F. (371° C. to 482° C.), wherein the first oxidizing atmosphere causes an exothermic increase in temperature from T2 to T3, thereby triggering introduction of the second inert atmosphere which results in cooling to T2, until the exothermic increase in temperature in the first oxidizing atmosphere is less than or equal to 50° F. (28° C.) within 15 min or when heat must be added to maintain T3 in the presence of the first oxidizing atmosphere, (iii) heating the pre-catalyst in a third inert atmosphere to a temperature T4 in a range from 1000° F. to 1400° F. (538° C. to 760° C.) and holding the pre-catalyst at T4 in the third inert atmosphere for a hold time t1 in a range from 1 hr to 15 hr, (iv) cooling the pre-catalyst in a fourth inert atmosphere to a temperature T5 in a range from 900° F. to 1200° F. (482° C. to 649° C.), wherein T5 is less than T4, (v) subjecting the pre-catalyst to a second oxidizing atmosphere at T5 for a hold time t2 in a range from 30 min to 10 hr, (vi) cooling in a third oxidizing atmosphere to a temperature T6 in a range from 500° F. to 700° F. (260° C. to 371° C.) to produce the activated (calcined) chromium catalyst, and (vii) purging the activated (calcined) chromium catalyst in a fifth inert atmosphere at T6 and cooling to ambient temperature (which is nominally 77° F. or 25° C.).

Generally, the features of this process (e.g., the pre-catalyst, the activated chromium catalyst, the oxidizing atmospheres, the inert atmospheres, the temperatures, and the hold times, among others) are independently described herein and these features can be combined in any combination to further describe the disclosed process to produce an activated chromium catalyst. Moreover, additional process steps can be performed before, during, and/or after any of the steps in any of the processes disclosed herein, and can be utilized without limitation and in any combination to further describe these processes, unless stated otherwise. Further, any activated chromium catalysts produced in accordance with the disclosed processes are within the scope of this disclosure and are encompassed herein. Activated chromium catalysts also may be referred to herein as calcined chromium catalysts.

Referring first to step (i), a pre-catalyst in contacted with a first inert atmosphere at a temperature T1 in a range from 500° F. to 700° F. (260° C. to 371° C.). The pre-catalyst comprises a silica support and from 0.1 to 5 wt. % chromium, from 0.1 to 10 wt. % titanium, and from 1 to 5 mol nitrogen/mol titanium. Other suitable ranges for the amount of chromium present on the pre-catalyst (or the activated chromium catalyst) include, but are not limited to, from 0.1 to 4 wt. %, from 0.2 to 5 wt. %, from 0.5 to 3 wt. %, from 0.5 to 2 wt. %, or from 0.5 to 1.5 wt. % of chromium. These weight percentages are based on the amount of chromium relative to the total weight of the pre-catalyst or the activated chromium catalyst. Likewise, other suitable ranges from the amount of titanium present on the pre-catalyst (or the activated chromium catalyst) include, but are not limited to, from 0.5 to 10 wt. %, from 1 to 10 wt. %, from 2 to 8 wt. %, or from 2 to 6 wt. % of titanium. These weight percentages also are based on the amount of titanium relative to the total weight of the pre-catalyst or the activated catalyst.

The pre-catalyst also can contain nitrogen from the nitrogen-containing compounds that were used to prepare the pre-catalyst. Generally, the pre-catalyst contains from 1 to 5 mol nitrogen per mole of titanium, and more often, from 1 to 4.5, from 1.5 to 5, from 1.5 to 4.5, from 2 to 5, from 2 to 4, or from 2 to 3 mol nitrogen/mol titanium.

The pre-catalyst also can be characterized by carboxylate groups/ligands that are present before activation, as well as the amount of carbon. In one aspect, the pre-catalyst can contain from 1 to 5 mol carboxylate per mole of titanium, from 1 to 4 mol carboxylate/mol titanium in another aspect, from 1 to 3 mol carboxylate/mol titanium in another aspect, from 1.5 to 5 mol carboxylate/mol titanium in another aspect, from 1.5 to 4 mol carboxylate/mol titanium in yet another aspect, and from 2 to 3 mol carboxylate/mol titanium in still another aspect. Examples of carboxylates (inclusive of dicarboxylates) include acetate, oxalate, citrate, malate, lactate, gluconate, glycolate, 2-hydroxy butyrate, glyoxylate, lactate, malate, malonate, phosphonoacetate, tartrate, and the like.

Additionally or alternatively, the pre-catalyst can contain from 0.5 to 10 wt. % carbon prior to activation, and more often, from 1 to 10 wt. %, from 1 to 5 wt. %, from 2 to 10 wt. %, from 2 to 8 wt. %, or from 2 to 6 wt. % carbon, and the like. These weight percentages are based on the amount of carbon relative to the weight of the pre-catalyst.

The pre-catalyst in step (i)—i.e., the pre-catalyst containing the silica support, from 0.1 to 5 wt. % chromium, from 0.1 to 10 wt. % titanium, and from 1 to 5 mol nitrogen/mol titanium—can be subjected to the activation process alone, or optionally in a blend or mixture with a second pre-catalyst having a different catalyst composition. Any relative amounts of the pre-catalyst in step (i) and the second pre-catalyst can be utilized. For instance, the second pre-catalyst can be a chromium/silica pre-catalyst; alternatively, a chromium/silica-titania cogel pre-catalyst; or alternatively, a chromia-silica-titania tergel pre-catalyst.

The temperature T1 in step (i) ranges from 500° F. to 700° F. (260° C. to 371° C.). In one aspect, T1 can fall within a range from 550° F. to 650° F. (288° C. to 343° C.), and in another aspect, T1 can range from 600° F. to 700° F. (315° C. to 371° C.), and in yet another aspect, T1 can range from 600° F. to 650° F. (315° C. to 343° C.). These and other temperature ranges disclosed herein are meant to encompass circumstances where the respective step in the process is performed at a series of different temperatures, instead of at a single fixed temperature, falling within the respective temperature ranges.

In step (ii), the pre-catalyst is subjected to cycles of a first oxidizing atmosphere at a temperature T2 in a range from 500° F. to 700° F. (260° C. to 371° C.) and a second inert atmosphere at a temperature T3 in a range from 700° F. to 900° F. (371° C. to 482° C.). The first oxidizing atmosphere causes an exothermic increase in temperature from T2 to T3, thereby triggering introduction of the second inert atmosphere which results in cooling to T2. Other illustrative and representative ranges for T2 include from 600° F. to 700° F. (315° C. to 371° C.), from 500° F. to 650° F. (260° C. to 343° C.), from 625° F. to 700° F. (329° C. to 371° C.), or from 575° F. to 675° F. (302° C. to 357° C.), and the like, and other illustrative and representative ranges for T3 include from 700° F. to 850° F. (371° C. to 454° C.), from 700° F. to 800° F. (371° C. to 427° C.), from 725° F. to 900° F. (385° C. to 482° C.), or from 750° F. to 850° F. (399° C. to 454° C.). As an example, in a first cycle, the pre-catalyst is subjected to the first oxidizing atmosphere at the temperature T2 in the 500° F. to 700° F. (260° C. to 371° C.) range, for instance, at 550° F. (288° C.). Due to the exotherm, the temperature increases to the temperature T3 in the 700° F. to 900° F. (371° C. to 482° C.) range, such as 775° F. (413° C.), at which point the pre-catalyst is subjected to the second inert atmosphere, cooling the pre-catalyst to any suitable temperature in the T2 temperature range of 500° F. to 700° F. (260° C. to 371° C.). In a second cycle, the pre-catalyst is subjected to the first oxidizing atmosphere at, for instance, a temperature of 625° F. (329° C.). Due to the exotherm, the temperature increases to the temperature T3 in the 700° F. to 900° F. (371° C. to 482° C.) range, such as 750° F. (399° C.), at which point the pre-catalyst is subjected to the second inert atmosphere, cooling the pre-catalyst again to any suitable temperature in the T2 temperature range of 500° F. to 700° F. (260° C. to 371° C.). While not being bound by theory, it is believed that limiting the temperature rise in step (ii) prevents premature oxidation of the chromium, while oxidizing organics and other residuals present on the pre-catalyst.

The cycles of oxidizing atmosphere and inert atmosphere are continued until the exothermic increase in temperature in the first oxidizing atmosphere is less than or equal to 50° F. (28° C.) within 15 min, or until heat must be added to maintain T3 in the presence of the first oxidizing atmosphere. In some aspects, step (ii) can be performed until the exothermic increase in temperature in the first oxidizing atmosphere is less than or equal to 40° F. (22° C.) within 15 min; alternatively, less than or equal to 25° F. (14° C.) in 15 min; or alternatively, less than or equal to 10° F. (6° C.) within 15 min. While not limited thereto, the number of cycles in step (ii) usually is from 2 to 10, but more often, the number of cycles in step (ii) is from 2 to 6, from 2 to 4, from 2 to 3, from 3 to 8, from 3 to 5, from 4 to 10, or from 4 to 6.

The first oxidizing atmosphere in each cycle of step (ii) can be the same or different and can independently comprise (or consist essentially of, or consist of) oxygen, air, a mixture of oxygen and an inert gas (e.g., nitrogen), a mixture of air and an inert gas (e.g., nitrogen), and the like, as well as any combination thereof. The first oxidizing atmosphere in each cycle of step (ii) can contain-independently-any suitable vol % of oxygen ranging from 1 to 100 vol %. In one aspect, the vol % of oxygen can be from 1 to 50 vol %, while in another aspect, the vol % of oxygen can be from 2 to 30 vol %, and in yet another aspect, the vol % of oxygen can be from 3 to 25 vol %, and in still another aspect, the vol % of oxygen can be from 4 to 21 vol %.

Similar to the first oxidizing atmosphere in each cycle of step (ii), the second inert atmosphere in each cycle of step (ii) can be the same or different. Independently, the second inert atmosphere in each cycle of step (ii) can comprise (or consist essentially of, or consist of) nitrogen, argon, or a combination thereof; alternatively, nitrogen; or alternatively, argon.

After step (ii) and the exotherms have been exhausted, the pre-catalyst is heated in step (iii) in a third inert atmosphere to a temperature T4 in a range from 1000° F. to 1400° F. (538° C. to 760° C.) and the pre-catalyst is held at T4 in the third inert atmosphere for a hold time t1 in a range from 1 hr to 15 hr. Any suitable heating rate can be used in step (iii), such as from 1 to 5° F./min (0.6 to 3° C./min), from 1.5 to 4° F./min (0.8 to 2.2° C./min), or from 2 to 3.5° F./min (1 to 2° C./min), and the like. In addition to the range of T4 from 1000° F. to 1400° F. (538° C. to 760° C.), other temperature ranges can be utilized, such as the following non-limiting ranges: from 1000° F. to 1300° F. (538° C. to 704° C.), from 1100° F. to 1400° F. (593° C. to 760° C.), from 1100° F. to 1300° F. (593° C. to 704° C.), or from 1200° F. to 1300° F. (649° C. to 704° C.), and so forth.

In step (iii), the pre-catalyst is held at T4 in the third inert atmosphere for a hold time t1 in a range from 1 hr to 15 hr. Other representative and non-limiting ranges for t1 include from 1 hr to 8 hr, from 2 hr to 10 hr, from 3 hr to 15 hr, from 3 hr to 8 hr, or from 4 hr to 6 hr, and the like. While not being bound by theory, it is believed that the high temperature exposure to an inert atmosphere can dehydroxylate the catalyst, but without premature oxidation of the chromium. Further, it is believed that by using a relatively low T4 temperature, key polymer attributes like molecular weight distribution and low long chain branching can be retained.

After step (iii), the pre-catalyst is cooled in step (iv) in a fourth inert atmosphere to a temperature T5 in a range from 900° F. to 1200° F. (482° C. to 649° C.), with the proviso that T5 is less than T4. Any suitable cooling rate can be utilized in step (iv), such as from 1 to 4° F./min (0.6 to 2.2° C./min), from 1.5 to 3.5° F./min (0.8 to 2° C./min), or from 2 to 3° F./min (1 to 1.7° C./min), and the like. In addition to the range of T5 from 900° F. to 1200° F. (482° C. to 649° C.), other temperature ranges can be utilized, such as the following non-limiting ranges: from 900° F. to 1100° F. (482° C. to 593° C.), from 950° F. to 1150° F. (510° C. to 621° C.), from 1000° F. to 1200° F. (538° C. to 649° C.), or from 1000° F. to 1100° F. (538° C. to 593° C.), and so forth.

After reaching the temperature T5 in the fourth inert atmosphere, the atmosphere is changed, and in step (v), the pre-catalyst is subjected to a second oxidizing atmosphere at T5 for a hold time t2 in a range from 30 min to 10 hr. Generally, the hold time t2 is a period of time sufficient to form at least 30 wt. %, and more often, at least 50 wt. %, at 70 wt. %, or at least 80 wt. % chromium (VI), based on the amount of chromium present on the activated chromium catalyst. In step (v), the hold time t2 can range from 30 min to 10 hr, but other representative and non-limiting ranges for t2 include from 30 min to 8 hr, from 1 hr to 10 hr, from 1 hr to 8 hr, from 2 hr to 6 hr, or from 3 hr to 5 hr, and the like. Often, there can be a balance between chromium conversion and melt index potential, since longer t2 hold times and higher temperatures can decrease melt index potential.

In step (vi), the catalyst is cooled in a third oxidizing atmosphere to a temperature T6 in a range from 500° F. to 700° F. (260° C. to 371° C.) to produce the activated chromium catalyst. Any suitable cooling rate can be utilized in step (vi), such as from 1 to 4° F./min (0.6 to 2.2° C./min), from 1.5 to 3.5° F./min (0.8 to 2° C./min), or from 2 to 3° F./min (1 to 1.7° C./min), and the like. In addition to the range of T6 from 500° F. to 700° F. (260° C. to 371° C.), other temperature ranges can be utilized, such as the following non-limiting ranges: from 500° F. to 650° F. (260° C. to 343° C.), from 550° F. to 700° F. (288° C. to 371° C.), from 550° F. to 650° F. (288° C. to 343° C.), or from 600° F. to 675° F. (315° C. to 357° C.), and so forth. While not required, often the temperature T6 is within 50° F. (28° C.), within 25° F. (14° C.), or within 10° F. (6° C.) of the temperature T1. While not being bound by theory, it is believed that changing to an inert atmosphere at a relatively high temperature can damage the conversion to Cr(VI).

After step (vi), the activated (calcined) chromium catalyst is purged in step (vii) in a fifth inert atmosphere at T6 and then cooled to ambient temperature (which is nominally 77° F. or 25° C.). While not limited thereto, in step (vii), the activated (calcined) chromium catalyst can be purged with the fifth inert atmosphere at T6 for a purge time t3 that typically falls within a range from 2 min to 20 hr; alternatively, from 5 min to 12 hr; alternatively, from 5 min to 5 hr; alternatively, from 15 min to 4 hr; or alternatively, from 30 min to 6 hr. While not being bound by theory, it is believed that purging in the inert atmosphere is important to remove oxygen/air from the catalyst pores, so as to prevent the oxygen/air from acting as a poison when in the reactor during polymerization.

In the process for producing the activated chromium catalyst, the first inert atmosphere, the third inert atmosphere, the fourth inert atmosphere, the fifth inert atmosphere, and the sixth inert atmosphere can be the same or different. For instance, in one aspect, the third inert atmosphere and the fourth inert atmosphere are the same, while in another aspect, the third inert atmosphere and the fourth inert atmosphere are different. The first inert atmosphere, the third inert atmosphere, the fourth inert atmosphere, the fifth inert atmosphere, and the sixth inert atmosphere—independently—can comprise (or consist essentially of, or consist of) nitrogen, argon, or a combination thereof; alternatively, nitrogen; or alternatively, argon.

Similarly, the second oxidizing atmosphere and the third oxidizing atmosphere can be the same or different. For instance, in one aspect, the second oxidizing atmosphere and the third oxidizing atmosphere are the same, while in another aspect, the second oxidizing atmosphere and the third oxidizing atmosphere are different. The second oxidizing atmosphere and the third oxidizing atmosphere—independently—can comprise (or consist essentially of, or consist of) oxygen, air, a mixture of oxygen and an inert gas (e.g., nitrogen), a mixture of air and an inert gas (e.g., nitrogen), and the like, as well as any combination thereof. The second oxidizing atmosphere and the third oxidizing atmosphere can contain—independently—any suitable vol % of oxygen ranging from 1 to 100 vol %. In one aspect, the vol % of oxygen can be from 1 to 50 vol %, while in another aspect, the vol % of oxygen can be from 2 to 30 vol %, and in yet another aspect, the vol % of oxygen can be from 3 to 25 vol %, and in still another aspect, the vol % of oxygen can be from 4 to 21 vol %.

Referring again to step (i) of the processes for producing an activated chromium catalyst, a pre-catalyst is contacted in step (i) with a first inert atmosphere at a temperature T1 in a range from 500° F. to 700° F. (260° C. to 371° C.). Prior to step (i), the pre-catalyst can be loaded into a suitable vessel and then heated to T1. Thus, the processes disclosed herein can further comprise, prior to step (i), a step of loading and heating the pre-catalyst in the first inert atmosphere to T1. Before loading, the pre-catalyst can be at any suitable temperature, but generally is at ambient temperature to 120° F. (49° C.), although not limited thereto.

Loading the pre-catalyst in advance of step (i) can be accomplished by loading from 2 to 10 portions, from 2 to 8 portions, from 3 to 10 portions, or from 3 to 6 portions, of the total pre-catalyst amount into the vessel before step (i) is performed. The number of portions can depend upon the size of the vessel and the amount of the catalyst to be activated, among other considerations. During the loading of each portion of the total pre-catalyst amount, the temperature is generally maintained in a range of from 300 to 600° F. (149° C. to 315° C.), such as from 400 to 600° F. (204° C. to 315° C.). Often, loading of each portion of the total pre-catalyst amount is stopped when the temperature drops below 400° F. (204° C.), or below 300° F. (149° C.), typically the result of water evaporation. Additionally or alternatively, loading of each portion of the total pre-catalyst amount can be stopped when the pressure rises above 1 psig, again largely the result of water evaporation (i.e., steam).

While not limited thereto, the total charge or total amount of the pre-catalyst can be at least 100 lb, at least 200 lb, at least 300 lb, at least 500 lb, at least 750 lb, at least 1000 lb, at least 1200 lb, or at least 1500 lb, and often up to and including 1750 lb, 2000 lb, or 2500 lb.

Herein, the processes for producing activated chromium catalysts can be conducted in any suitable calcination or activation vessel, but often the processes are conducted in a fluidized bed vessel, or any one or more steps in the processes can be conducted in the fluidized bed vessel. The fluidized bed vessel can be operated batchwise or continuously, or any one or more steps in the processes can conducted batchwise or continuously. Catalyst amounts and bed depths can be any that are suitable for fluidized bed operation. In the processes for producing activated chromium catalysts, the pre-catalyst (or the activated catalyst) can be contacted with a gas stream at any suitable linear velocity, generally in the range of from 0.05 to 0.6 ft/sec. For instance, each step in the disclosed processes can be performed by fluidizing the pre-catalyst (or the activated catalyst, as the context requires) in an inert fluidizing gas (for an inert atmosphere) or an oxygen-containing fluidizing gas (for an oxidizing atmosphere) at a linear velocity of the gas stream—independently—within a range of from 0.05 to 0.6 ft/sec, and in some aspects, from 0.05 to 0.3 ft/sec or from 0.1 to 0.4 ft/sec, and in other aspects, from 0.2 to 0.5 ft/sec, from 0.2 to 0.4 ft/sec, or from 0.2 to 0.3 ft/sec.

While not limited thereto, the diameter of the fluidized bed vessel can be at least 12 in, at least 20 in, at least 30 in, at least 40 in, or at least 50 in, and often up to and including 55 in, 60 in, or 70 in.

The activated catalyst produced from the disclosed activation processes has many properties that are superior to that of otherwise identical catalysts that were not subjected to the specific steps described hereinabove. For instance, the activated catalyst consistent with this invention can have a melt index potential greater (e.g., at least 10% greater, at least 25% greater, at least 50% greater, at least 75% greater, or at least 100% greater) than that of an otherwise identical catalyst (often referred to as a control catalyst) activated by exposure to an oxidizing atmosphere at a temperature T4 for a hold time of t1. Alternatively, the control catalyst can be Magnapore® catalyst, which is commercially available from W. R. Grace, when calcined at a temperature of 1200° F. (649° C.) for a time period of 3 hr (for lab scale) or 8 hr (for large scale). When making these comparisons, it is necessary that the polymerization reaction be conducted under the same conditions. That is, the reaction temperature should be identical, and the concentration of ethylene and comonomer in the reaction zone should also be the same, and the productivity reached should be the same, preferably in the range of 3000 gPE/gCat to 5000 gPE/gCat.

This improved melt index potential can be measured via melt index (MI, $I_2$), or high load melt index (HLMI, $I_{21}$), or both. As an example, the activated catalyst of the present invention can have a MI potential of at least 0.2, at least 0.3, at least 0.4, at least 0.5, at least 0.6, at least 0.7, at least 0.8, at least 0.9, at least 1, or at least 1.2 g/10 min. Additionally or alternatively, the activated catalyst of the present invention, when tested in isobutane at 105° C., 550 psig ethylene to 3000 gPE/gCat, can have a HLMI potential of at least 20, at least 25, at least 30, at least 35, at least 40 at least 50, at least 60, at least 70, at least 80, or at least 100 g/10 min.

While the herein described activated catalysts can offer significant improvements in melt index potential, the polymer produced often can be very similar to that produced with a control catalyst. In some aspects, therefore, the activated catalyst consistent with this invention can produce a polymer under standard polymerization conditions having a ratio of Mw/Mn (or a ratio of Mz/Mw, or a CY-a parameter) that is within 35% (or within 30%, within 25%, within 20%, within 15%, within 10%, or within 5%) of the Mw/Mn (or the Mz/Mw, or the CY-a parameter) of a polymer produced using a control catalyst as defined above. Standard polymerization conditions are detailed in the examples below, but briefly, isobutane diluent, 105° C. polymerization temperature, 550 psig ethylene pressure, for a time needed to reach a productivity of 3000 g polymer per g of catalyst.

Additionally or alternatively, the activated catalyst consistent with this invention can produce a polymer under standard polymerization conditions having a Mw that is 30% less than (or 25% less than, 20% less than, 15% less than, or 10% less than) the Mw of a polymer produced using a control catalyst as defined above, when compared at the same or substantially the same MI (or HLMI), as the context requires.

Unexpectedly, the activated catalyst consistent with this invention can produce polymers with lower amounts of gels. In one aspect, wherein the activated catalyst can produce a polymer under standard polymerization conditions that has a total film gel count (or a catalyst particle gel count) of less than or equal to 100 gels per ft$^2$ of 25 micron thick film (and in some instances, less than or equal to 80, or less than or equal to 60, or less than or equal to 40, or less than or equal to 30, or less than or equal to 20, or less than or equal to 10, or less than or equal to 8, or less than or equal to 5, gels per ft$^2$ of 25 micron thick film), wherein film gels encompass a size (diameter) greater than 200 μm (and caused by catalyst particles for the catalyst particle gel count).

Generally, the disclosed processes are applicable to the activation of any supported chromium pre-catalyst that comprises a silica support, thereby forming the activated chromium catalyst with at least a portion of the chromium in a hexavalent oxidation state. Thus, supported chromium pre-catalysts contemplated herein encompass those prepared by contacting a silica support with a chromium-containing compound (a chromium precursor, a source of chromium) and a titanium-containing compound (a titanium precursor, a source of titanium). The pre-catalyst often can be referred to as a titanated chromium/silica pre-catalyst. The pre-catalyst can be formed by depositing a water-soluble titanium compound and a water-soluble chromium compound onto a pre-formed silica in an aqueous slurry, then spray drying the slurry to form the pre-catalyst. The pre-catalyst also can be formed by depositing a water-soluble titanium compound onto a pre-formed silica already containing the necessary chromium in an aqueous slurry, then spray drying the slurry to form the pre-catalyst.

While not limited thereto, typical titanium compounds include titanium carboxylates, which can also contain a nitrogen compound to help adjust the pH. Carboxylates can be di-carboxylic or tricarboxylic acids and alpha-hydroxy mono-carboxylic acids, examples of which include oxalic acid, citric acid, malic acid, lactic acid, glycolic acid, gluconic acid, 2-hydroxybutyric acid, glyoxylic acid, malonic acid, phosphonoacetic acid, tartaric acid, and the like. Suitable nitrogen compounds include simple alkyl amines, alkanol amines, cyclic amines, and more complex multi-nitrogen compounds, as well as amides and quaternary ammonium hydroxides. Examples include dimethyl formamide (DMF), acetamide, acryl amide, allyl amine, ammonia, methyl amine, diethyl amine, ethanol amine, diethanol amine, butyl amine, tert-butyl amine, N,N'-dibutyl urea, tetraethyl ammonium hydroxide, ammonium hydroxide, dimethyl ethanol amine, creatine, creatinine, 1,8-diazabicyclo[5.4.0]undec-7-ene (DBU), diethylhydroxy amine, diisopropanol amine, dimethylaminoethanol, dimethyl carbamate, dimethyl formamide, dimethyl glycine, dimethylisopropanol amine, N,N'-dimethyl urea, ethyl amine, glycol amine, hexyl amine, hydroxyamine, imidazole, isopropanol amine, methacryl amide, N-methyl aniline, N-methyl-2-propanol amine, methyldiethanol amine, methyl formamide, propyl amine, 2-propanol amine, pyrazole, pyrrolidine, pyrrolidinone, succinimide, tetraethylammonium hydroxide, tetramethylammonium hydroxide, triethanol amine, triisopropanol amine, trimethyl amine, urea, and the like. Typical chromium compounds include chromium (III) acetate, basic chromium (III) acetate, chromium (III) formate, $Cr_2O_3$, $Cr(OH)_3$, $Cr(NO_3)_3$, and the like. Generally, the chromium compound is a trivalent compound, though hexavalent chromium compounds are also suitable, but only if they are then reduced to the trivalent form during catalyst manufacture. The silica used in this invention can be any suitable pre-formed silica xerogel that has an acceptable porosity, with grades available from Asahi Glass and Grace (e.g., HA30W). While not limited thereto, silicas having BET surface areas of from 300 to 500 m$^2$/g, pore volumes of from 1.5 to 2.0 m$^2$/g (e.g., approximately 1.6 mL/g), and d50 average particle sizes of from 30 to 130 microns (e.g., 40 to 70 microns) are conveniently used. Additional information on pre-catalysts that can be activated as described herein, and methods of preparing the pre-catalysts, is provided in representative U.S. Pat. Nos. 10,300,460, 10,323, 109, 10,513,570, 10,543,480, 10,722,874, 10,858,456, 10,889,664, and 11,242,416.

Chromium polymerization catalysts generally require supports of relatively high porosity so as to allow fragmentation of the catalyst and subsequent egress of the polymer chains from the fragments, a portion of these chains being hundreds of times longer than the pore diameter in the catalyst. Thus, the total pore volume of the pre-catalyst (or the silica support, or the activated chromium catalyst) often falls within a range from 0.5 to 5 mL/g, and more often, from 1 to 5 mL/g, from 1 to 3 mL/g, or from 1.5 to 2 mL/g, and the like. The BET surface area of the pre-catalyst (or the silica support, or the activated chromium catalyst) is not limited to any particular range, but generally is in a range from 100 to 700 m$^2$/g, such as from 200 to 600 m$^2$/g, from 250 to 550 m$^2$/g, or from 300 to 500 m$^2$/g, and the like.

The pre-catalyst, the silica support, and the activated chromium catalyst can have any suitable shape or form, and such can depend on the type of polymerization process in which the chromium catalyst is utilized. Generally, however, the pre-catalyst, the silica support, and the activated chromium catalyst have a relatively small particle size, in which representative ranges for the average (d50) particle size of the pre-catalyst (or the silica support, or the activated chromium catalyst) can include from 10 to 500 microns, from 15 to 250 microns, from 30 to 130 microns, or from 40 to 70 microns, although not limited thereto.

Likewise, the amount of chromium in an oxidation state of +5 or less in the pre-catalyst (prior to activation) is not particularly limited. The amount of the chromium of the pre-catalyst in an oxidation state of +5 or less typically is at least 50 wt. %, and more often, at least 60 wt. %, at least 70 wt. %, at least 80 wt. %, at least 90 wt. %, or at least 95 wt. %. This percentage is based on the amount of the chromium of the pre-catalyst in an oxidation state of +5 or less relative to the total amount of chromium on the pre-catalyst.

Conversely, at least 40 wt. % of the chromium in the activated chromium catalyst is present in a hexavalent oxidation state after the activation step, and more often at least 50 wt. % is present as chromium (VI). In further aspects, at least 60 wt. %, at least 70 wt. %, at least 80 wt. %, at least 90 wt. %, or at least 95 wt. %, of the chromium in the activated chromium catalyst can be present in an oxidation state of +6. These weight percentages are based on the total amount of chromium present on the activated chromium catalyst. Traditional chromium (VI) catalysts often will have an orange, yellow, or tan color, indicating the presence of chromium (VI).

Polymerization Processes

Olefin polymers (e.g., ethylene polymers) can be produced from the activated chromium catalysts using any suitable olefin polymerization process using various types of polymerization reactors, polymerization reactor systems, and polymerization reaction conditions. One such olefin polymerization process can comprise (I) performing any process to produce the activated chromium catalyst disclosed herein, and (II) contacting the activated chromium catalyst and an optional co-catalyst with an olefin monomer and an optional olefin comonomer in a polymerization reactor system under polymerization conditions to produce an olefin polymer. This invention also encompasses any olefin polymers (e.g., ethylene polymers) produced by any of the polymerization processes disclosed herein.

In the polymerization processes, a co-catalyst can be utilized with the activated chromium catalyst. In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used are not limited to the co-catalysts described above. Other suitable co-catalysts (such as organomagnesiums and organolithiums) are well known to those of skill in the art including, for example, those disclosed in U.S. Pat. Nos. 3,242,099, 4,794, 096, 4,808,561, 5,576,259, 5,807,938, 5,919,983, 7,294,599 7,601,665, 7,884,163, 8,114,946, and 8,309,485.

As used herein, a "polymerization reactor" includes any polymerization reactor capable of polymerizing olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof; or alternatively, the polymerization reactor system can comprise a slurry reactor, a gas-phase reactor, a solution reactor, or a combination thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high-pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608. Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Representative gas phase reactors are disclosed in U.S. Pat. Nos. 5,352,749, 4,588,790, 5,436,304, 7,531,606, and 7,598,327.

According to still another aspect, the polymerization reactor system can comprise a high-pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect, the polymerization reactor system can comprise a solution polymerization reactor wherein the monomer/comonomer are contacted with the catalyst by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously or pulsed).

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. Various polymerization conditions can be held substantially constant, for example, for the production of a particular grade of the olefin polymer (or ethylene polymer). A suitable polymerization temperature can be any temperature below the de-polymerization temperature according to the Gibbs Free energy equation. Typically, this includes from 60° C. to 280° C., for example, or from 60° C. to 120° C., depending upon the type of polymerization reactor(s). In some reactor systems, the polymerization temperature generally can be within a range from 70° C. to 105° C., or from 75° C. to 100° C.

Suitable pressures will also vary according to the reactor and polymerization type. The pressure for liquid phase polymerizations in a loop reactor is typically less than 1000 psig (6.9 MPa). Pressure for gas phase polymerization is usually at 200 to 500 psig (1.4 MPa to 3.4 MPa). High pressure polymerization in tubular or autoclave reactors is generally run at 20,000 psig to 75,000 psig (138 MPa to 517 MPa). Polymerization reactors can also be operated in a supercritical region occurring at generally higher temperatures and pressures. Operation above the critical point of a pressure/temperature diagram (supercritical phase) can offer advantages to the polymerization reaction process.

Olefin monomers that can be employed with the chromium catalysts and polymerization processes of this invention typically can include olefin compounds having from 2 to 30 carbon atoms per molecule and having at least one olefinic double bond, such as ethylene or propylene. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene (e.g., to produce a polypropylene homopolymer or a propylene-based copolymer).

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin or a $C_3$-$C_{20}$ alpha-olefin). According to one aspect of this invention, the olefin monomer used in the polymerization process can comprise ethylene. In this aspect, the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

In an aspect, the polymerization process can be performed at a productivity of from 2000 to 5000 g polymer per gram of catalyst, and/or at a space-time yield of greater than or equal to 2, 2.5, 2.8, 3, or 4 (lb/hr)/gal and/or less than or equal to 6, 5.5, or 5 (lb/hr)/gal, in a commercial loop reactor making at least a 0.947 g/cc density ethylene/1-hexene copolymer as determined by ISO 1183 part 2. The space-time yield can fall within a range from any minimum value to any maximum value listed above, therefore representative and non-limiting ranges for the space-time yield include from 2 to 6, from 2 to 5, from 2.5 to 5.5, from 2.8 to 6, from 3 to 6, from 3 to 5.5, from 4 to 6, or from 4 to 5 (lb/hr)/gal.

In another aspect, the polymerization process can performed at a productivity of from 2000 to 5000 g polymer per gram of catalyst, and/or at a space-time yield of greater than or equal to 2, 2.5, 2.8, 3, or 4 (lb/hr)/gal and/or less than or equal to 6, 5.5, or 5 (lb/hr)/gal, in a commercial loop reactor making at least a 0.938 g/cc density ethylene/1-hexene copolymer as determined by ISO 1183 part 2. As above, the space-time yield can fall within a range from any minimum value to any maximum value listed above, and therefore representative and non-limiting ranges for the space-time yield include from 2 to 6, from 2 to 5, from 2.5 to 5.5, from 2.8 to 6, from 3 to 6, from 3 to 5.5, from 4 to 6, or from 4 to 5 (lb/hr)/gal.

Ethylene Polymers and Olefin Polymers

This invention is also directed to, and encompasses, the olefin polymers produced using any of the chromium catalysts and polymerization processes disclosed herein. Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can comprise an ethylene homopolymer, an ethylene/1-butene copolymer, an ethylene/1-hexene copolymer, and/or an ethylene/1-octene copolymer, while in another aspect, the olefin polymer can comprise an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

An illustrative and non-limiting example of a first ethylene polymer (e.g., an ethylene/α-olefin copolymer)—produced using the activated chromium catalysts disclosed herein—can have a high load melt index (HLMI) in a range from 10 to 80 g/10 min, a density in a range from 0.93 to 0.96 g/cm$^3$, and a total film gel count of less than or equal to 100 gels per ft$^2$ of 25 micron thick film (or less than or equal to 80, or less than or equal to 60, or less than or equal to 40, or less than or equal to 30, or less than or equal to 20, or less than or equal to 10, or less than or equal to 8, or less than or equal to 5, gels per ft$^2$ of 25 micron thick film), wherein film gels encompass a size greater than 200 μm. Alternatively, the gel count of gels >200 microns that are caused by unfragmented catalyst particles (e.g., unfragmented Cr/silica catalyst particles) can be less than or equal to 100 gels per ft$^2$ of 25 micron thick film, or less than or equal to 80, or less than or equal to 60, or less than or equal to 40, or less than or equal to 30, or less than or equal to 20, or less than or equal to 10, or less than or equal to 8, or less than or equal to 5, gels per ft$^2$ of 25 micron thick film The ethylene polymer contains a total (both disintegrated and non-fragmented) of from 150 to 680 ppm silica, from 1.5 to 6.8 ppm chromium, and from 1.5 to 40 ppm titanium.

An illustrative and non-limiting example of a second ethylene polymer (e.g., an ethylene/α-olefin copolymer) can have a melt index (MI) in a range from 0.1 g/10 min to 1 g/10 min, a density in a range from 0.93 to 0.96 g/cm$^3$, and a total film gel count (or a catalyst particle gel count) of less than or equal to 100 gels per ft$^2$ of 25 micron thick film (or less than or equal to 80, or less than or equal to 60, or less than or equal to 40, or less than or equal to 30, or less than or equal to 20, or less than or equal to 10, or less than or equal to 8, or less than or equal to 5, gels per ft$^2$ of 25 micron thick film), wherein film gels encompass a size greater than 200 μm (and can be caused by unfragmented catalyst particles for the catalyst particle gel count). The ethylene polymer contains from 150 to 680 ppm silica, from 1.5 to 6.8 ppm chromium, and from 1.5 to 40 ppm titanium.

Further, these illustrative first and second ethylene polymers (which are typically in the form of pellets or beads) consistent with the present invention also can have any of the polymer properties listed below and in any combination, unless indicated otherwise.

The density of the ethylene-based polymers often can range from 0.93 to 0.96 or from 0.93 to 0.956 g/cm$^3$. In one aspect, the density can range from 0.934 to 0.96, from 0.934 to 0.956 in another aspect, from 0.934 to 0.95 in yet another aspect, or from 0.945 to 0.958 g/cm$^3$ in still another aspect.

The ethylene polymers can have a variety of melt flow properties, such as indicated by the high load melt index (HLMI) in a range from 10 to 80 g/10 min. In some aspects, the HLMI of the ethylene polymers can fall within a range from to 10 to 70, from 10 to 60, from 10 to 50, from 20 to 80, from 20 to 50, or from 30 to 50 g/10 min, and the like. Additionally or alternatively, these ethylene polymers can have melt index (MI) from 0.1 to 1 g/10 min, and more often, from 0.1 to 0.75, from 0.1 to 0.6, from 0.2 to 1, from 0.2 to 0.6, or from 0.3 to 0.6 g/10 min, and the like.

In an aspect, the ethylene polymers can have a Mw in a range from 100,000 to 250,000, from 120,000 to 200,000, or from 140,000 to 180,000 g/mol. For instance, the Mw can be less than or equal to 180,000, less than or equal to 170,000, or less than or equal to 160,000 g/mol. Additionally or alternatively, the ethylene polymer can have a Mn from 3,000 to 25,000, from 8,000 to 20,000, from 10,000 to 18,000, or from 12,000 to 15,000 g/mol. For instance, the Mn can be less than or equal to 15,000, less than or equal to 14,000, or less than or equal to 13,000 g/mol. Additionally or alternatively, the ethylene polymers can have a Mz from 500,000 to 2,000,000, from 500,000 to 1,800,000, or from 600,000 to 1,500,000 g/mol. For instance, the Mz can be less than or equal to 1,300,000, less than or equal to 1,100,000, or less than or equal to 1,000,000 g/mol. While not limited thereto, these ethylene polymers can have a ratio of Mw/Mn in a range from 7 to 20, such as from 8 to 18, from 9 to 17, from 9 to 15, or from 10 to 14. For instance, the Mw/Mn can be less than or equal to 14, less than or equal to 13, less than or equal to 12.5, or less than or equal to 11.5. Similarly, representative ranges for the ratio of Mz/Mw include from 5 to 10, from 5 to 9, from 6 to 10, or from 6 to 9. For instance, the Mz/Mw can be less than or equal to 8, less than or equal to 7.5, less than or equal to 7, less than or equal to 6.5, or less than or equal to 6.

Additionally or alternatively, these ethylene polymers can have a CY-a parameter of from 0.1 to 0.3 in one aspect, from 0.13 to 0.2 in another aspect, from 0.13 to 0.17 in another aspect, from 0.16 to 0.26 in another aspect, from 0.17 to 0.24 in yet another aspect, and from 0.18 to 0.22 in still another aspect. For instance, the CY-a parameter can be less than or equal to 0.18, less than or equal to 0.17, less than or equal to 0.165, less than or equal to 0.16, less than or equal to 0.155, or less than or equal to 0.15. This rheological parameter is determined from viscosity data measured at 190° C. and using the Carreau-Yasuda (CY) empirical model described herein.

Moreover, the ethylene polymers are produced with a supported activated chromium catalyst, as discussed herein. Ziegler-Natta and metallocene based catalyst systems are not required. Therefore, the ethylene polymers can contain no measurable amount of zirconium or hafnium or vanadium or magnesium (catalyst residue), i.e., less than 0.1 ppm by weight. In some aspects, the ethylene polymers can contain, independently, less than 0.08 ppm, less than 0.05 ppm, or less than 0.03 ppm, of zirconium (or hafnium, or vanadium, or magnesium). The amounts of these elements can be determined by ICP analysis on a PerkinElmer Optima 8300 instrument. Polymer samples can be ashed in a Thermolyne furnace with sulfuric acid overnight, followed by acid digestion in a HotBlock with HCl and $HNO_3$ (3:1 v:v).

Instead, the ethylene polymers typically contain from 1.5 to 6.8 ppm chromium, from 1.5 to 40 ppm titanium, and from 150 to 680 ppm silica (by weight). Other illustrative ranges for the chromium content of these ethylene polymers include, but are not limited to, from 1.8 to 6 ppm, from 2 to 6.8 ppm, from 2 to 6 ppm, from 2 to 5 ppm, from 2 to 4.5 ppm, from 2 to 4 ppm, from 1.5 to 6 ppm, from 1.5 to 5.5 ppm, from 1.5 to 5 ppm, or from 3 to 6 ppm of chromium. Other illustrative ranges for the titanium content of these ethylene polymers include, but are not limited to, from 1.5 to 30 ppm, from 2 to 40 ppm, from 2 to 30 ppm, from 2 to 10 ppm, from 3 to 30 ppm, from 3 to 20 ppm, from 3 to 10 ppm, from 4 to 20 ppm, from 5 to 40 ppm, from 5 to 25 ppm, from 5 to 15 ppm, from 7 to 17 ppm, or from 8 to 16 ppm of titanium. The amounts of these elements can be determined by ICP analysis on a PerkinElmer Optima 8300 instrument. Other illustrative ranges for the silica content of these ethylene polymers include, but are not limited to, from 180 to 600 ppm, from 200 to 680 ppm, from 200 to 600 ppm, from 200 to 500 ppm, from 200 to 400, from 150 to 600 ppm, from 150 to 500 ppm, or from 150 to 450 ppm of silica. The silica content of the polymer is quantified by an ASTM ash test, as discussed hereinbelow.

The gel count amounts can be based on the total film gel count (all film defects greater than 200 microns in diameter) or the catalyst particle gel count (film defects greater than 200 microns in diameter that are caused by catalyst particles) of number of gels per $ft^2$ of 25 micron thick film of the ethylene polymer. Most of the gels in chromium-derived polymers are catalyst particle gels (hard gels) that arise from the supported catalyst particle. When these supported chromium catalysts are used to polymerize ethylene, most of the catalyst particles are broken or disintegrated into imperceptibly small fragments that are dispersed in the final polymer, causing no problems, especially in thin film products. However, depending on the polymerization conditions, some catalyst particles can be ejected from the reactor before becoming active and thus before being disintegrated by polymerization. These non-fragmented catalyst particles can result in visual imperfections on the surface of the final product or article, usually called "gels" or "hard gels" or "catalyst gels," and film grades are especially sensitive to this issue (notably, such catalyst particle gels also can create noticeable defects on the surfaces of thick parts, resulting in poor surface aesthetics of the final product or article, and such surface roughness also can interfere with printing operations). Consequently, polymer film grades typically have a rigid manufacturing specification on gels greater than 200 microns in diameter. During manufacture of the polymer, the polymer is formed into a 25 micron thick film and the number of gels is automatically measured by an in-line camera specially designed to count the gels greater than 200 microns in size. Total gel count includes catalyst particle gels as well as gels due to contamination from foreign material, or polymer particles, or additive particles, for example.

Typically, to qualify as a "gel" the optical imperfection recognized by the camera and computer on the gel analyzer must register the gel size as greater than 200 µm in diameter. From experience, catalyst particles of 100+ µm diameter generally register as 200+ µm gels, due to the polymer sometimes clinging to the catalyst particle, thus adding to its size, and also because of the "lens effect", in which the catalyst particle appears magnified by the lens-shaped polymer coating. The latter is an optical magnification of the catalyst particle's size due to the formation of a convex lens made of clear polymer that surrounds the catalyst particle. Thus, catalyst particle gels can be reduced by minimizing catalyst particles of 100 µm or more in size in the ethylene polymer.

Another unexpected benefit of the ethylene polymers produced using the supported chromium catalysts—activated as described herein—is improved processability, as compared to polymers produced with chromium catalysts that are activated conventionally (control or comparative examples, discussed further below). In extrusion processing for blown film, pipe, blow molding, and other converting applications, the extrusion pressure can be reduced by at least 3%, at least 5%, at least 8%, or at least 10%, or at least 15%, and in some instances, up to 20%, or more. This improved processability can be measured or quantified on a pelletizing extruder that forms the ethylene polymer into pellets or beads, or on an extruder that is used to produce film. Accordingly, the same holds true for pelletizing during manufacture of the inventive polymers. Again, the extrusion pressure can be reduced by at least 3%, 5%, 8%, 10%, or 15%, or up to 20%, or more.

Similarly, the melt temperature during extrusion, during molding, during pelletization, etc., is often lower with the inventive polymers. The extrusion melt temperature can typically drop by at least 5, 8, 10, 15, or 20, or up to 25° F. (3, 4, 6, 8, or 11, or up to 14° C.), or more. And the power consumption, as measured by amperage to the extruder, is also lowered during the respective extrusion process as compared to a polymer made from a control catalyst. This can typically be at least 5%, or at least 8%, or 10%, or 12%, or 15% lower. Further, the specific energy, or work imparted into the polymer, can be lowered at least 1%, or 2%, or 3%, or 4%.

Another benefit of polymers made by the catalysts of this invention is that they can often display enhanced mixing during extrusion. This is evidenced by a larger drop in melt index upon passage through the extruder, which indicates increased chain entanglement. The melt index change can be at least 0.21, or 0.22, or 0.23, or 0.24, or 0.25, or 0.26 g/10 min. When expressed as a percentage this can be at least a 30% drop in melt index, a 40% drop in melt index, a 42% drop in melt index, a 45% drop in melt index, or a 48% drop in melt index, and up to a 50%, 55%, or 60% drop in melt index, or more. The HLMI can also drop by a similar percentage.

Articles and Products

Articles of manufacture can be formed from, and/or can comprise, the olefin polymers (e.g., ethylene polymers) of this invention and, accordingly, are encompassed herein. For example, articles which can comprise the polymers of this invention can include, but are not limited to, an agricultural film, a geomembrane film, a packaging film, a pallet wrap film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers often are added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992. In some aspects of this invention, an article of manufacture can comprise any of olefin polymers (or ethylene polymers) described herein, and the article of manufacture can be or can comprise a film (e.g., a blown film), a pipe, or a blow molded product.

Examples

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Standard catalyst activation for control or comparative catalysts in laboratory testing was performed as follows. Approximately 10 g of a catalyst sample was placed in a 1.75-inch quartz tube fitted with a sintered quartz disk at the bottom. While the catalyst was supported on the disk, dry air was blown up through the disk at a linear rate of 1.6-1.8 standard ft$^3$/hr (45-51 L/hr). An electric furnace around the quartz tube was then turned on and the temperature was raised at the rate of 400° C./hr to the indicated temperature, typically 650° C., was reached. At that temperature the catalyst was fluidized for 3 hr in the dry air. Afterward, the catalyst was collected and stored under dry nitrogen, where the catalyst was protected from oxygen and moisture until ready for polymerization testing.

The inventive catalysts used the same equipment in the laboratory, but the procedure was quite different. Typically, the catalyst was cycled between air and nitrogen at a low temperature, and then the catalyst was heated up to the maximum temperature in nitrogen. After a hold period, the temperature was lowered to another temperature where the gas stream was switched to air. After another hold period, the catalyst was cooled down to 200-350° C. in air. The gas stream was changed back to nitrogen at this temperature, and the catalyst was purged in nitrogen for another 30 min. Then, the catalyst was cooled to ambient temperature in nitrogen and bottled for later testing. This general inventive activation procedure was used but specific temperatures and times were varied for different experiments.

Activation Method A: The catalyst was treated as described in the standard activation procedure for control or comparative catalysts.

Activation Method B: The same procedure was used as in Activation A, except that the final temperature was 704° C. instead of 650° C.

Activation Method C: Catalyst was charged in two increments under nitrogen. Three cycles of air to 350° C., followed by cool-down to 150° C. in nitrogen. Then, nitrogen to 704° C., hold for 4 hr. Cool to 550° C. in nitrogen and then switch to air. Hold in air for 1 hr. Cool in air to 300° C., then purge with nitrogen for 30 min, cool and bottle.

Activation Method D: The same procedure was used as in Activation C, except that the hold period at 550° C. was for 2 hr instead of 1 hr.

Other catalyst activations (Methods E-H) were conducted in a large scale fluidized bed calciner, having a 42-in diameter, with gas flows of 0.1 ft/sec below 700° C. and 0.2 ft/sec above that temperature. The calciner had a design similar to the quartz lab activator, only constructed on a much larger scale. The recited temperature (in the calciner) was the average of three (3) thermocouples positioned at the top, bottom, and middle of the fluidized bed calciner. The temperature of the catalyst/pre-catalyst is effectively the same as the calciner temperature.

Activation Method E: The catalyst, 600 lb, was charged as a single load in nitrogen, then the atmosphere was changed to air. The temperature was raised at a ramp rate of 2.7° F./min (1.5° C./min) to 1350° F. (732° C.). The catalyst was held at that temperature for 8 hr, then cooled in air to 600° F. (315° C.), where the catalyst was purged with nitrogen for 3 hr, then discharged.

Activation Method F: Approximately 600 lb of catalyst was charged to the calciner under nitrogen in four unequal portions, while the temperature was at 600° F. (315° C.). The first portions were somewhat smaller than later ones. The temperature quickly dropped to 450-500° F. (232-260° C.) with each portion being charged, and then the temperature recovered back to 600° F. (315° C.). After all the catalyst was charged, the atmosphere was changed to air and the temperature began to rise as volatile compounds on the catalyst were oxidized. When the temperature reached 900° F. (482° C.), the atmosphere was changed back to nitrogen and the temperature gradually dropped back to about 600° F. (315° C.). This cycle was repeated three times until there was no more exotherm. Then, in nitrogen, the temperature was raised to 1300° F. (704° C.) at a ramp rate of 2.4° F./min (1.3° C./min) to and held at that temperature for 5 hr. While still in nitrogen, the temperature was then cooled to 1025° F. (552° C.). The atmosphere was again changed to air and the catalyst was held at that temperature for 5 hr. The catalyst was then cooled in air down to 650° F. (343° C.) and the atmosphere was again changed back to nitrogen. After purging for 3 hr, the catalyst was discharged into an air-tight metal tank.

Figure 2:
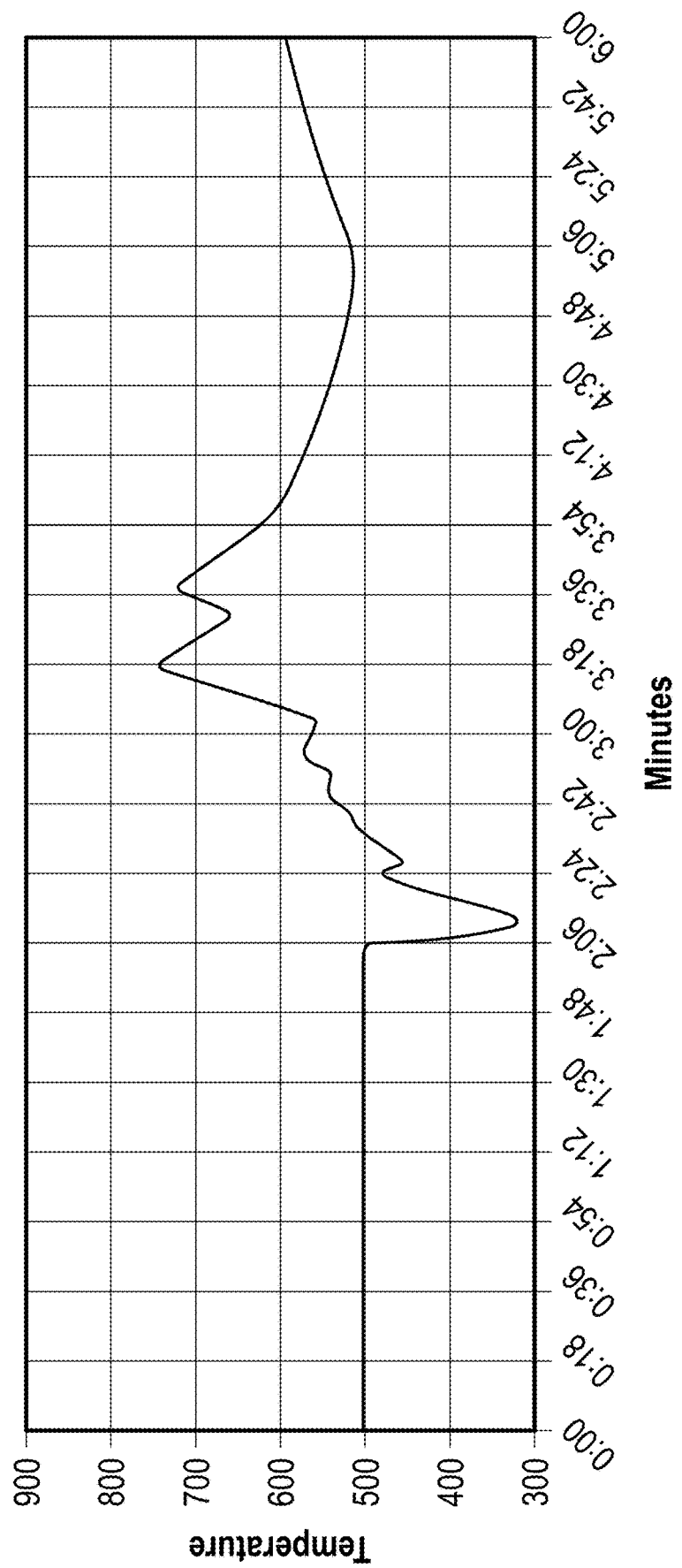
FIG. 2 presents a plot of temperature versus time for the exotherm elimination portion of FIG. 1.

Activation Method G: The procedure of Activation F was followed except that the catalyst was charged in two equal portions, and the air treatment at 1025° F. (552° C.) was for 2 hr. FIG. 1 is a representation of a time-temperature activation sequence similar to that of Activation Methods F-G, and FIG. 2 further illustrates the exotherm elimination portion of FIG. 1.

Figure 3:
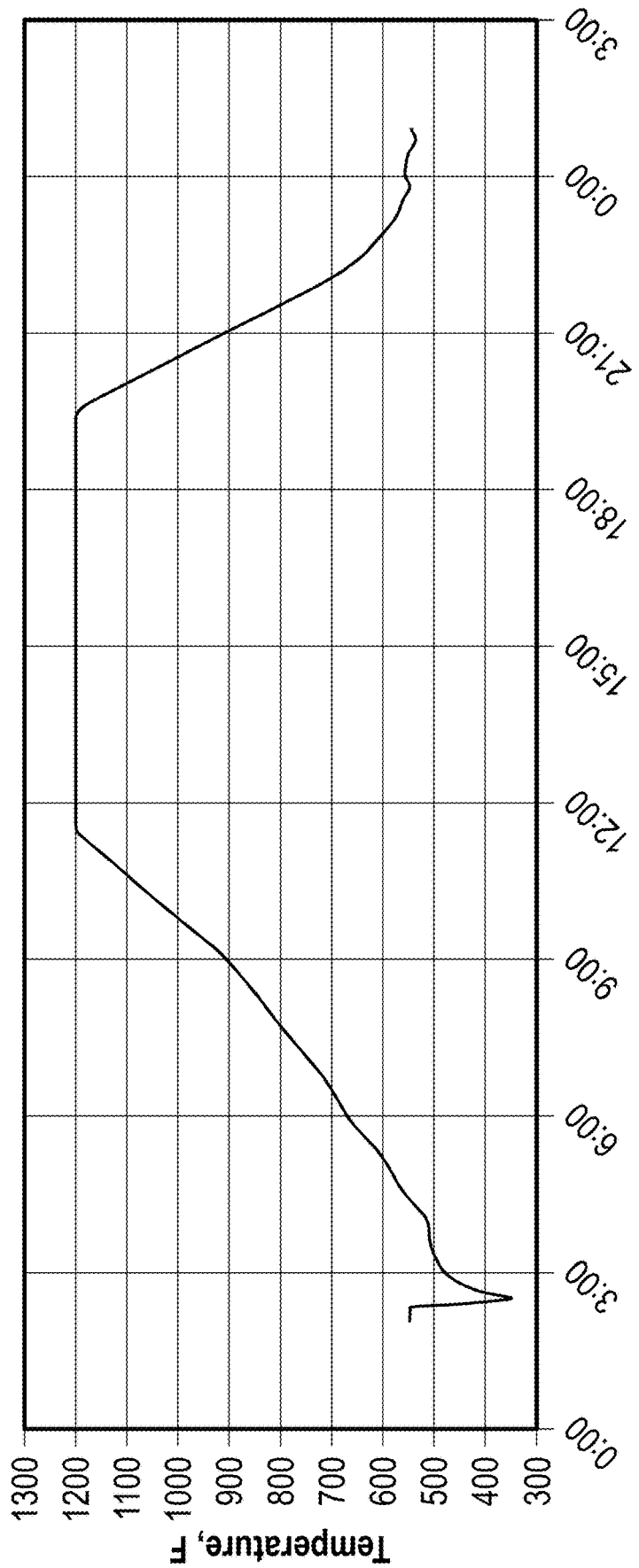
FIG. 3 presents a plot of temperature versus time for a representative method of activation similar to that of Activation Method H.

Activation Method H: The catalyst was charged as a single portion in air. The temperature was raised at 2.7° F./min (1.5° C./min) to 1200° F. (649° C.), where it was held for 8 hr, then cooled in air to 600° F. (315° C.) where it was purged with nitrogen for 3 hr, then discharged. FIG. 3 is a representation of a time-temperature activation sequence similar to that of Activation Method H.

The lab-activated and large scale activated catalysts were tested in polymerization experiments that were performed as follows: In a 2.2-L steel reactor equipped with a marine stirrer rotating at 500 rpm. The reactor was surrounded by a steel jacket through which was passed a mixture of steam and water, which was adjusted to maintain a constant temperature of 105° C. (+/−0.5° C.) with the help of electronic control instruments. Unless otherwise stated, a small amount (0.01 to 0.10 g normally) of the solid catalyst was first charged under nitrogen to the dry reactor. Next, 1.2 L of isobutane liquid was charged and the reactor heated up to the specified temperature (105° C.). Finally, ethylene was added to the reactor to equal a fixed pressure, 550 psig, which was maintained during the experiment. The stirring was continued until about 3000 grams of polymer were produced per gram of catalyst, and the instantaneous reaction rate was noted by recording the flow of ethylene into the reactor to maintain the set pressure.

After the desired productivity, 3000 g/g, had been reached, the ethylene flow was stopped, and the reactor slowly depressurized and opened to recover a granular polymer powder. In all cases, the reactor was clean with no indication of any wall scale, coating, or other forms of fouling. The polymer powder was then removed and weighed. Activity was specified as g of polymer produced per g of solid catalyst charged per hr.

The melt index and high load melt index were then obtained on the recovered polymer. Melt Index (MI, $I_2$, g/10 min) was determined in accordance with ASTM D1238-E, condition 190/2, at 190° C. with a 2.16 kg weight. High load melt index (HLMI, $I_{21}$, g/10 min) was determined in accordance with ASTM D1238-F, Condition 190/21.6, at 190° C. with a 21.6 kg weight. These two values, having been obtained from polymer made under standardized reactor conditions, were then used for comparison between catalysts for their "melt index potential" (MIP) or "high load melt index potential" (HLMIP). Density was determined in grams per cubic centimeter (g/cm$^3$) on a compression molded sample, cooled at 15° C. per minute, and conditioned for 40 hours at room temperature in accordance with ASTM D1505 and ASTM D4703.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. An injection volume of about 400 μL was used. The integral calibration method was used to deduce molecular weights and molecular weight distributions using a Chevron Phillips Chemical Company's HDPE polyethylene resin, MARLEX® BHB5003, as the broad standard. An integral table of the broad standard was pre-determined in a separate experiment with SEC-MALS. Mn is the number-average molecular weight, Mw is the weight-average molecular weight, Mz is the z-average molecular weight, and Mp is the peak molecular weight (location, in molecular weight, of the highest point of the molecular weight distribution curve).

Melt rheological characterizations were performed as follows. Small-strain (less than 10%) oscillatory shear measurements were performed on an Anton Paar MCR rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is shown below:

$$|\eta*(\omega)| = \frac{\eta^0}{[1 + (\tau_\eta \omega)^a]^{(1-n)/a}},$$

wherein:
|η*(ω)|=magnitude of complex shear viscosity;
$\eta_0$=zero shear viscosity;
$\tau_\eta$=viscous relaxation time (Tau(η);
a="breadth" parameter (CY-a parameter);
n=fixes the final power law slope, fixed at 2/11; and
ω=angular frequency of oscillatory shearing deformation.

Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, Dynamics of Polymeric Liquids, Volume 1, Fluid Mechanics, 2nd Edition, John Wiley & Sons (1987).

Six (6) different pre-catalysts were made, each according to a slightly different procedure. All started with about 550 lb of silica (dry basis) having a surface area of 450 m$^2$/g and a pore volume of 1.9 mL/g. The d50 average particle size was 60 microns. The silica was charged to a 1000-gal reactor and combined with 2750 lb of deionized water. The slurry was stirred and other ingredients were added as summarized in Table 1 below. After all ingredients were added, the mixture was spray-dried to form pre-catalysts 1-6. Pre-catalysts 1-6 contained nominally 1 wt. % chromium and 3.5 wt. % titanium, with the exception of pre-catalyst 3, which contained 4 wt. % titanium. A comparative commercially available catalyst, designated as type M (1 wt. % chromium and 2.5 wt. % titanium), was also tested, and this catalyst had a surface area of 500 m$^2$/g, a pore volume of 2.5 mL/g, and a d50 average particle size of 130 microns.

TABLE 1

(amounts in lb)

| Pre-catalyst | 1 | 2 | 3 | 4 | 5 | 6 |
|---|---|---|---|---|---|---|
| Titanium tetraisopropoxide | 114 | 114 | 130 | 114 | 0 | 114 |
| Oxalic acid dihydrate | 101 | 101 | 116 | 126 | 0 | 101 |
| Dimethyl formamide (DMF) | 88 | 88 | 100 | 88 | 0 | 0 |
| Chromium triacetate | 24.2 | 24.2 | 19.4 | 19.4 | 0 | 0 |
| Basic Cr acetate | 0 | 0 | 0 | 0 | 22.9 | 18.3 |
| Dimethyl ethanol amine | 0 | 0 | 0 | 0 | 0 | 17.4 |
| 80 wt. % triethanolamine Titanate solution | 0 | 0 | 0 | 0 | 127 | 0 |

The melt index potential for pre-catalysts 1-6 that were activated using comparative Activation Methods A-B and inventive Activation Methods C-D are summarized in Tables 2-4. Each value shown in these tables is the average of several tests. High load melt index potential (HLMIP) is listed in Table 2 and melt index potential (MIP) is listed in Table 3. In sum, the inventive activations using methods C-D generally produced higher melt index and HLMI polymers than did the comparative activation methods, even those activated at a higher temperature. This is advantageous during commercial operations. Beneficially, as shown below, this elevated MI potential was also achieved without negatively impacting other polymer properties.

Similar to Tables 2-4, Table 5 summarizes the melt index potential for pre-catalysts 1-5 and comparative catalyst M using comparative Activation Methods E and H and inventive Activation Methods F-G (large scale fluidized bed calcination). As above, the inventive activations using methods F-G generally produced higher melt index and HLMI polymers than did the comparative activation methods, even those activated at a higher temperature.

TABLE 2

High Load melt index potential of activated catalysts.

| | Pre-Catalyst | | | | | |
|---|---|---|---|---|---|---|
| Activation Method | 1 | 2 | 3 | 4 | 5 | 6 |
| A | 32.8 | 25.7 | 25.0 | 24.9 | 22.5 | 30.6 |
| B | 40.8 | 44.8 | 35.9 | 40.6 | 34.8 | 44.2 |
| C | 39.7 | 79.3 | | | | |
| D | | | 79.7 | | | |
| A | 30.1 | 29.3 | 27.1 | 37.0 | 35.2 | 40.3 |

TABLE 3

Melt index potential of activated catalysts.

| Activation | Pre-Catalyst | | | | | |
|---|---|---|---|---|---|---|
| Method | 1 | 2 | 3 | 4 | 5 | 6 |
| A | 0.42 | 0.27 | 0.32 | 0.29 | 0.22 | 0.45 |
| B | 0.55 | 0.61 | 0.53 | 0.53 | 0.39 | 0.53 |
| C | 0.51 | 0.99 | | | | |
| D | | | 0.96 | | | |
| A | 0.43 | 0.41 | 0.37 | 0.54 | 0.50 | 0.61 |

TABLE 4

Shear response (HLMI/MI) of polymers.

| Activation | Pre-Catalyst | | | | | |
|---|---|---|---|---|---|---|
| Method | 1 | 2 | 3 | 4 | 5 | 6 |
| A | 77.8 | 94.3 | 78.9 | 86.0 | 102.3 | 68.0 |
| B | 74.2 | 73.4 | 67.7 | 76.5 | 89.2 | 83.4 |
| C | 77.8 | 80.1 | | | | |
| D | | | 83.0 | | | |
| A | 69.4 | 72.0 | 74.2 | 69.2 | 70.4 | 66.5 |

TABLE 5

Large scale activations.

| Activation Method | Pre-Catalyst | MI | HLMI | HLMI/MI |
|---|---|---|---|---|
| E | 1 | 0.41 | 30.6 | 74.6 |
| F | 1 | 0.74 | 60.6 | 81.9 |
| E | 3 | 0.50 | 38.4 | 76.8 |
| G | 4 | 0.98 | 75.5 | 77.0 |
| G | 4 | 1.16 | 96.0 | 82.8 |
| E | 5 | 0.39 | 32.2 | 82.6 |
| H | M | 0.45 | 30.6 | 68.0 |

Catalysts activated by inventive methods F and G were then used in a large-scale 18,000 gallon loop reactor using isobutane diluent to make a series of polymers having a density of about 0.938 g/cc and a melt index of about 0.2 g/10 min. Table 6 below shows the reaction conditions.

Rheology and gel-permeation chromatography results are summarized in Table 7 below. Unexpectedly, the inventive polymers, those made using the inventive catalyst activation procedure, had a lower molecular weight than the control polymers, as well as a narrower molecular weight distribution (Mw/Mn or Mz/Mw). The inventive polymers had a lower CY-a parameter, which is the breadth of the relaxation time distribution, and a HLMI that was much higher for the same melt index, despite having a lower molecular weight. Further, the tan delta at 0.1/sec shear rate was lower as well. In sum, this is a unique and beneficial combination of rheology and molecular weight characteristics.

These molecular weight and rheological features result in some processing advantages during pelletization and extrusion/converting operations. These polymers were then blown into 25 micron film and compared. The physical properties, dart drop resistance and MD and TD tear resistance were identical within the margin of error. But the processing was quite different. Table 8 summarizes the extrusion and film blowing performance. Processability was improved with the inventive polymers. Despite similar MI and density, the extruder amperage during film blowing was lower (requiring less energy). In Table 8, the average inventive polymer consumed 17.3% lower power (current). Likewise, the extrusion pressure, measured at the head of the extruder, was lower, and similarly the pressure at the screen was lower. The average inventive polymer required 13.9% less head pressure, and 15.2% less pressure at the screen, than the average control polymer. Hence, the melt temperature was lower because of the improved extrusion processability. In the examples shown in Table 8, the average inventive polymer had a melt temperature that was 6.8° F. (3.8° C.) lower than the average control polymer. These differences were observed even though the extruder rpm and the output rate were the same.

The improved ease of extrusion exhibited by the inventive polymers was also evident in the pelletization of the polymer during manufacturing. This is summarized in Table 9 below, which compares the pelletizing parameters between inventive and control polymers. Although the pelletizing rate and the final melt index were unchanged, the inventive polymer extruded more easily than the control polymer. This is evident by the 9% lower pressure and the 4% lower specific energy, and also by the 24° F. (13° C.) lower melt temperature. This means that less work has been put into the polymer during pelletizing, which thus produces a lower melt temperature, costing less and causing less mechanical and thermal degradation. However, there was a larger change in the melt index upon pelletizing the inventive polymer. This is shown in Table 9 by the absolute MI change, and also by the percent change in MI. The drop in melt index upon pelletization is a result of mixing, that is, of chain entanglement, which raises the melt viscosity. Thus, the increased drop in melt index can be taken as a sign of superior mixing in the inventive polymer.

Another surprising aspect of these inventive polymers was their extremely low film gel-counts when formed into 25 micron thick film. Gels greater than 200 microns in diameter were measured with an automatic camera on a 25 micron thick film formed from the polymers as they were made during the manufacturing process. Although the specification is normally 170 gels/ft$^2$ or less, these inventive polymers had gel-counts far below that. The gel data is summarized in Table 8. Typical gel-count values during the production of this grade of polymer (0.938 g/cc density and 0.2 g/10 min melt index) range from 60 to 120 gels/ft$^2$. However, as Table 8 shows, all of the inventive polymers unexpectedly produced film having single-digit gel-counts. During their production, individual hourly values frequently dropped to 3 or even 2 gels/ft$^2$. While not wishing to be bound by the following theory, it is believed that the unexpectedly low gel count resulted from a combination of catalyst productivity, high catalyst activation/calcination temperature, and the particle size distribution of the catalyst. Table 10 summarizes the gel count data, catalyst productivity, and ppm of ash, titanium, and chromium (ppm of silica is the ash content minus the total of chromium content and titanium content). For the inventive polymers, chromium content was 3-4 ppm, titanium content was 12-14 ppm, and silica content was 330-370 ppm, and as noted above, gel counts were less than 10 gels/ft$^2$.

Further, additional testing was performed on another 20-25 samples of the inventive polymers in Tables 6-10; the chromium content was in the 2.4-4.2 ppm range, the titanium content was in the 8.5-14.8 ppm range, the silica content was in the 233-403 ppm range, and the gel count was in the 3-17 gels/ft$^2$ range (and the average gel count was ~6 gels/ft$^2$.

Gel counting was performed on 25 μm thick film from a Killion 125 cast film line with a die width of 203 mm. This used a CR7 winder model, using a cooler bath temperature of 23° C. The gel inspection area was 3 square meters. The screw diameter was 1.24 inches, running at 10 rpm, the line speed at approximately 3 lb/hr, and the temperature zones were all set at 400° F. The upper and lower take-up rolls were set at 35. Before measurements were made, the machine was purged for 120 minutes. The chill roll speed was set to 23 rpm.

Film gels were measured on the 25 μm thick film using an automated camera-based gel counting machine; the camera model was a FSA100 and Optical Control System (OCS) software was used. The system included a light source and a detector. The film was passed through the system, between the light source and the detector, with a 150-mm inspection width. The 3 square meters of film area were inspected and the gels with sizes (diameters) of greater than 200 μm were analyzed, and then normalized per square foot of film—this is the measured gels/ft$^2$ of 25 micron thick film in Table 8.

As noted above, catalyst particles of 100+ μm diameter generally register as 200+ μm gels, due to the polymer sometimes clinging to the catalyst particle, thus adding to its size, and also because of the "lens effect", in which the catalyst particle appears magnified by the lens-shaped polymer coating. The latter is an optical magnification of the catalyst particle's size due to the formation of a convex lens made of clear polymer that surrounds the catalyst particle. Thus, catalyst particle gels can be reduced by minimizing catalyst particles of 100 μm or more in size in the ethylene polymer.

To determine the amount of all the gels that were catalyst particle gels, the composition of each of the gels can be determined (e.g., catalyst particles, cellulose, cross-linked polymer, additives, and so forth). One of skill in the art would readily be able to determine the cause of the gels using a variety of non-limiting techniques such as hot-stage microscopy (and observing melting behavior), infrared spectroscopy, electron microscopy, and the like. For instance, an IR spectrum can be used to help determine if the gel is the result of a catalyst particle or something else. IR can even be used to determine what catalyst is responsible for the gels, in situations where multiple catalysts are used in one reactor to make different polymer grades.

The ash content of the polymer can be determined by ASTM D5630-13 procedure B). Herein, the ASTM ash content encompasses the amount of solid oxide (e.g., silica), chromium, and titanium. Since chromium and titanium are typically a very minor portion of the ash content, the ash content is very close to the solid oxide (e.g., silica) content, but solid oxide (e.g., silica) content herein equals ash content minus the total of chromium content and titanium content.

Most Cr polymerization catalysts contain nominally about 1 wt. % total Cr, usually in the form of Cr(III) prior to calcination. During this last preparation step, the catalyst is then activated by calcination, which converts a portion of the initial Cr(III) to Cr(VI). The activation process disclosed herein converts most of the Cr into Cr(VI). Chromium (VI) content of the calcined catalyst or ash can be determined as follows. A small sample, typically about half a gram, is first slurried in about 25 mL of deionized water and 25 mL of 18 N sulfuric acid, to which is added 4 drops of indicator solution (1,10-phenanthroline iron (II) sulfate, 0.025 M in water), all in a 250 ml beaker with a magnetic stir bar. The resulting mixture often is a yellow-green color. While stirring, this mixture is titrated using approximately 0.025 M ferrous ammonium sulfate solution (FAS). The mixture should go through several color changes, becoming greener and gradually turning to a blue color, then finally quickly turning red-orange. When the mixture turns red-orange, the titration is complete. The wt. % Cr(VI) is determined from the following formula:

Chromium wt. %=1.733% (*FAS* molarity)(*FAS* mL)/(sample in g).

TABLE 6

| Catalyst | Inventive | Control |
|---|---|---|
| Rate, klb/h | 48.8 | 51.2 |
| Temp ° F. | 193.3 | 193.3 |
| Temp ° C. | 90 | 90 |
| Catalyst injection rate | 12.4 | 12.3 |
| C6=/C2=, lb/klb | 61.2 | 55.5 |
| Solids | 41.5% | 41.7% |
| C2= concentration | 3.69 wt. % | 4.05 wt. % |
| H2 concentration | 0.65 mol % | 0.63 mol % |
| Rxn residence time | 44 min | 42 min |

TABLE 9

| Polymer | Control | Inventive |
|---|---|---|
| Extruder Rate, klbs/h | 48.7 | 48.4 |
| Melt Temp, ° F. | 425 | 449 |
| Melt Temp, ° C. | 218 | 232 |
| Specific Energy, W-h/lb | 76.0 | 79.2 |
| Pressure, psig* | 2183 | 2399 |
| Pellet Melt Index | 0.261 | 0.265 |
| Initial Powder MI** | 0.538 | 0.466 |
| MI Change | 0.277 | 0.202 |
| % MI change | 51% | 43% |

*at screen pack
**melt index of initial polymer powder exiting the reactor

TABLE 10

| Example And Gel Count | Productivity (lb/lb) | Ash (ppm) | Cr (ppm) | Ti (ppm) |
|---|---|---|---|---|
| Inventive (5/ft$^2$) | 2611 | 383 | 3.8 | 13.4 |
| Inventive (3/ft$^2$) | 2841 | 352 | 3.5 | 12.3 |
| Inventive (6/ft$^2$) | 2874 | 348 | 3.5 | 12.2 |
| Inventive (3/ft$^2$) | 2817 | 355 | 3.6 | 12.4 |
| Control (60-120/ft$^2$) | 2959 | 338 | 3.4 | 8.5 |
| Control (60-120/ft$^2$) | 3356 | 298 | 3.0 | 7.5 |
| Control (60-120/ft$^2$) | 3030 | 330 | 3.3 | 8.3 |

TABLE 7

| Sample | η0 Pa-sec | Tau sec | CY-a | MI dg/min | HIMI dg/min | Tan δ 0.1/ec | Mn kg/mol | Mw kg/mol | Mz kg/mol | Mw/Mn | Mz/Mw |
|---|---|---|---|---|---|---|---|---|---|---|---|
| Inventive | 8.09E+05 | 2.52 | 0.1508 | 0.42 | 29.2 | 1.539 | 12.7 | 154.4 | 947 | 12.2 | 6.1 |
| Inventive | 1.05E+06 | 3.38 | 0.1485 | 0.36 | 26.0 | 1.491 | 13.4 | 154.7 | 855 | 11.6 | 5.5 |
| Inventive | 1.10E+06 | 3.49 | 0.1482 | 0.35 | 24.9 | 1.485 | 13.0 | 169.1 | 1338 | 13.0 | 7.9 |
| Inventive | 1.29E+06 | 4.14 | 0.1455 | 0.34 | 24.8 | 1.457 | 13.3 | 157.1 | 1004 | 11.8 | 6.4 |
| Inventive | 1.39E+06 | 4.41 | 0.1443 | 0.33 | 24.1 | 1.447 | 12.8 | 161.3 | 1005 | 12.6 | 6.5 |
| Control | 3.43E+05 | 1.01 | 0.1833 | 0.32 | 18.4 | 1.791 | 14.6 | 190.8 | 1424 | 13.1 | 7.5 |
| Control | 3.76E+05 | 1.16 | 0.1829 | 0.30 | 17.9 | 1.755 | 15.7 | 198.5 | 1586 | 12.6 | 8.0 |
| Control | 1.37E+06 | 5.10 | 0.1579 | 0.21 | 15.2 | 1.435 | 10.1 | 185.0 | 1580 | 18.4 | 8.5 |
| Control | 6.53E+05 | 2.07 | 0.1741 | 0.23 | 14.1 | 1.613 | 12.3 | 190.0 | 1499 | 15.5 | 7.9 |

| Example | Density g/mL | MI dg/min | Current amp | Head Pressure psig | Melt Temp ° F. | Extruder RPM | Specific Rate | ft/min at 1 mil | Screen Pressure psig | Gels >200 um gels/sqft |
|---|---|---|---|---|---|---|---|---|---|---|
| Inventive | 0.9387 | 0.24 | 20 | 3076 | 438 | 41 | 6.10 | 164 | 1925 | 5 |
| Inventive | 0.9387 | 0.26 | 28 | 3024 | 437 | 41 | | 170 | 1840 | 3 |
| Inventive | 0.9384 | 0.27 | 22 | 2889 | 437 | 41 | | 165 | 1845 | 6 |
| Inventive | 0.9386 | 0.25 | 27 | 3096 | 438 | 41 | | 167 | 1906 | 3 |
| Control | 0.9390 | 0.18 | 23 | 3505 | 442 | 42 | 5.95 | 160 | 2202 | 60-120 |
| Control | 0.9390 | 0.19 | 32 | 3542 | 446 | 42 | 5.95 | 165 | 2335 | 60-120 |
| Control | 0.9387 | 0.22 | 33 | 3485 | 445 | 41 | | 166 | 2109 | 60-120 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process to produce an activated (calcined) chromium catalyst, the process comprising (i) contacting a pre-catalyst with a first inert atmosphere at a temperature T1 in a range from 500° F. to 700° F. (260° C. to 371° C.), wherein the pre-catalyst comprises a silica support and from 0.1 to 5 wt. % chromium, from 0.1 to 10 wt. % titanium, and from 1 to 5 mol nitrogen/mol titanium; (ii) subjecting the pre-catalyst to cycles of a first oxidizing atmosphere at a temperature T2 in a range from 500° F. to 700° F. (260° C. to 371° C.) and a second inert atmosphere at a temperature T3 in a range from 700° F. to 900° F. (371° C. to 482° C.), wherein the first oxidizing atmosphere causes an exothermic increase in temperature from T2 to T3, thereby triggering introduction of the second inert atmosphere which results in cooling to T2, until the exothermic increase in temperature in the first oxidizing atmosphere is less than or equal to 50° F. (28° C.) within 15 min or when heat must be added to maintain T3 in the presence of the first oxidizing atmosphere; (iii) heating the pre-catalyst in a third inert atmosphere to a temperature T4 in a range from 1000° F. to 1400° F. (538° C. to 760° C.) and holding the pre-catalyst at T4 in the third inert atmosphere for a hold time t1 in a range from 1 hr to 15 hr; (iv) cooling the pre-catalyst in a fourth inert atmosphere to a temperature T5 in a range from 900° F. to 1200° F. (482° C. to 649° C.), wherein T5 is less than T4; (v) subjecting the pre-catalyst to a second oxidizing atmosphere at T5 for a hold time t2 in a range from 30 min to 10 hr; (vi) cooling in a third oxidizing atmosphere to a temperature T6 in a range from 500° F. to 700° F. (260° C. to 371° C.) to produce the activated (calcined) chromium catalyst; and (vii) purging the activated (calcined) chromium catalyst in a fifth inert atmosphere at T6 and cooling to ambient temperature.

Aspect 2. The process defined in aspect 1, wherein in step (vii), the activated (calcined) chromium catalyst is purged with the fifth inert atmosphere at T6 for a purge time t3 in any suitable range or any range disclosed herein, e.g., from 2 min to 20 hr, from 5 min to 12 hr, from 5 min to 5 hr, from 15 min to 4 hr, or from 30 min to 6 hr.

Aspect 3. The process defined in any one of the preceding aspects, further comprising prior to step (i), a step of loading and heating the pre-catalyst in the first inert atmosphere to T1.

Aspect 4. The process defined in aspect 3, wherein the pre-catalyst is at a temperature from ambient to 120° F. (49° C.) before loading.

Aspect 5. The process defined aspect 3 or 4, wherein loading the pre-catalyst into contacting step (i) occurs in 2-10 portions of a total pre-catalyst amount.

Aspect 6. The process defined in aspect 5, wherein during loading of each portion of the total pre-catalyst amount, the temperature is maintained in a temperature range of from 300 to 600° F. (149° C. to 315° C.) or from 400 to 600° F. (204° C. to 315° C.).

Aspect 7. The process defined in aspect 5 or 6, wherein loading of each portion of the total pre-catalyst amount is stopped when the temperature drops below 400° F. (204° C.), or below 300° F. (149° C.).

Aspect 8. The process defined in any one of aspects 5-7, wherein loading of each portion of the total pre-catalyst amount is stopped when the pressure rises above 1 psig.

Aspect 9. The process defined in any one of the preceding aspects, wherein the first inert atmosphere, the third inert atmosphere, the fourth inert atmosphere, the fifth inert atmosphere, and the sixth inert atmosphere are the same or different and independently comprise (or consist essentially of, or consist of) nitrogen, argon, or a combination thereof.

Aspect 10. The process defined in any one of aspects 1-9, wherein the third inert atmosphere and the fourth inert atmosphere are the same.

Aspect 11. The process defined in any one of aspects 1-9, wherein the third inert atmosphere and the fourth inert atmosphere are different.

Aspect 12. The process defined in any one of the preceding aspects, wherein the second inert atmosphere in each cycle of step (ii) is the same or different and independently comprises (or consists essentially of, or consists of) nitrogen, argon, or a combination thereof.

Aspect 13. The process defined in any one of the preceding aspects, wherein the second oxidizing atmosphere and the third oxidizing atmosphere independently comprise (or consist essentially of, or consist of) oxygen, air, a mixture of oxygen and an inert gas (e.g., nitrogen), a mixture of air and an inert gas (e.g., nitrogen), or a combination thereof, with any suitable vol % of oxygen, e.g., from 1 to 100 vol %, from 1 to 50 vol %, from 2 to 30 vol %, from 3 to 25 vol %, or from 4 to 21 vol %.

Aspect 14. The process defined in any one of aspects 1-13, wherein the second oxidizing atmosphere and the third oxidizing atmosphere are the same.

Aspect 15. The process defined in any one of aspects 1-13, wherein the second oxidizing atmosphere and the third oxidizing atmosphere are different.

Aspect 16. The process defined in any one of the preceding aspects, wherein the first oxidizing atmosphere in each cycle of step (ii) is the same or different and independently comprises (or consists essentially of, or consists of) oxygen, air, a mixture of oxygen and an inert gas (e.g., nitrogen), a mixture of air and an inert gas (e.g., nitrogen), or a combination thereof, with any suitable vol % of oxygen, e.g., from 1 to 100 vol %, from 1 to 50 vol %, from 2 to 30 vol %, from 3 to 25 vol %, or from 4 to 21 vol %.

Aspect 17. The process defined in any one of the preceding aspects, wherein T1 is in any suitable range or any range disclosed herein, e.g., from 550° F. to 650° F. (288° C. to 343° C.), from 600° F. to 700° F. (315° C. to 371° C.), or from 600° F. to 650° F. (315° C. to 343° C.).

Aspect 18. The process defined in any one of the preceding aspects, wherein T2 is in any suitable range or any range disclosed herein, e.g., from 600° F. to 700° F. (315° C. to 371° C.), from 500° F. to 650° F. (260° C. to 343° C.), from 625° F. to 700° F. (329° C. to 371° C.), or from 575° F. to 675° F. (302° C. to 357° C.).

Aspect 19. The process defined in any one of the preceding aspects, wherein T3 is in any suitable range or any range disclosed herein, e.g., from 700° F. to 850° F. (371° C. to 454° C.), from 700° F. to 800° F. (371° C. to 427° C.), from 725° F. to 900° F. (385° C. to 482° C.), or from 750° F. to 850° F. (399° C. to 454° C.).

Aspect 20. The process defined in any one of the preceding aspects, wherein step (ii) is performed until the exothermic increase in temperature in the first oxidizing atmosphere is less than or equal to 40° F. (22° C.), less than or equal to 25° F. (14° C.), or less than or equal to 10° F. (6° C.), within 15 min.

Aspect 21. The process defined in any one of the preceding aspects, wherein step (ii) comprises any suitable number of cycles or any number of cycles disclosed herein, e.g., from 2 to 10, from 2 to 6, from 2 to 4, from 2 to 3, from 3 to 8, from 3 to 5, from 4 to 10, or from 4 to 6.

Aspect 22. The process defined in any one of the preceding aspects, wherein any suitable heating rate is utilized in step (iii) or any heating rate disclosed herein, e.g., from 1 to 5° F./min (0.6 to 3° C./min), from 1.5 to 4° F./min (0.8 to 2.2° C./min), or from 2 to 3.5° F./min (1 to 2° C./min).

Aspect 23. The process defined in any one of the preceding aspects, wherein T4 is in any suitable range or any range disclosed herein, e.g., from 1000° F. to 1300° F. (538° C. to 704° C.), from 1100° F. to 1400° F. (593° C. to 760° C.), from 1100° F. to 1300° F. (593° C. to 704° C.), or from 1200° F. to 1300° F. (649° C. to 704° C.).

Aspect 24. The process defined in any one of the preceding aspects, wherein t1 is in any suitable range or any range disclosed herein, e.g., from 1 hr to 8 hr, from 2 hr to 10 hr, from 3 hr to 15 hr, from 3 hr to 8 hr, or from 4 hr to 6 hr.

Aspect 25. The process defined in any one of the preceding aspects, wherein any suitable cooling rate is utilized in step (iv) or any cooling rate disclosed herein, e.g., from 1 to 4° F./min (0.6 to 2.2° C./min), from 1.5 to 3.5° F./min (0.8 to 2° C./min), or from 2 to 3° F./min (1 to 1.7° C./min).

Aspect 26. The process defined in any one of the preceding aspects, wherein T5 is in any suitable range or any range disclosed herein, e.g., from 900° F. to 1100° F. (482° C. to 593° C.), from 950° F. to 1150° F. (510° C. to 621° C.), from 1000° F. to 1200° F. (538° C. to 649° C.), or from 1000° F. to 1100° F. (538° C. to 593° C.).

Aspect 27. The process defined in any one of the preceding aspects, wherein t2 is in any suitable range or any range disclosed herein, e.g., from 30 min to 8 hr, from 1 hr to 10 hr, from 1 hr to 8 hr, from 2 hr to 6 hr, or from 3 hr to 5 hr.

Aspect 28. The process defined in any one of the preceding aspects, wherein t2 is a period of time sufficient to form at least 30 wt. %, at least 50 wt. %, at 70 wt. %, or at least 80 wt. % chromium (VI), based on the amount of chromium on the activated (calcined) chromium catalyst.

Aspect 29. The process defined in any one of the preceding aspects, wherein T6 is in any suitable range or any range disclosed herein, e.g., from 500° F. to 650° F. (260° C. to 343° C.), from 550° F. to 700° F. (288° C. to 371° C.), from 550° F. to 650° F. (288° C. to 343° C.), or from 600° F. to 675° F. (315° C. to 357° C.).

Aspect 30. The process defined in any one of the preceding aspects, wherein T6 is within 50° F. (28° C.), within 25° F. (14° C.), or within 10° F. (6° C.) of T1.

Aspect 31. The process defined in any one of the preceding aspects, wherein any suitable cooling rate is utilized in step (vi) or any cooling rate disclosed herein, e.g., from 1 to 4° F./min (0.6 to 2.2° C./min), from 1.5 to 3.5° F./min (0.8 to 2° C./min), or from 2 to 3° F./min (1 to 1.7° C./min).

Aspect 32. The process defined in any one of the preceding aspects, wherein the activated (calcined) catalyst has a melt index potential greater (by any suitable amount or any amount disclosed herein, e.g. at least 10% greater, at least 25% greater, at least 50% greater, at least 75% greater, or at least 100% greater) than that of an otherwise identical catalyst (or control catalyst) activated by exposure to an oxidizing atmosphere at a temperature of 1200° F. (649° C.) for a time period of 3 hr (or 8 hr), when measured via MI, HLMI, or both.

Aspect 33. The process defined in any one of the preceding aspects, wherein the activated (calcined) catalyst produces a polymer under standard polymerization conditions having a ratio of Mw/Mn (or Mz/Mw, or CY-a parameter) that is within 35% (or within 30%, 25%, 20%, 15%, 10%, or 5%) of the Mw/Mn (or Mz/Mw, or CY-a parameter) of a polymer produced using an otherwise identical catalyst (or control catalyst) activated by exposure to an oxidizing atmosphere at a temperature of 1200° F. (649° C.) for a time period of 3 hr (or 8 hr).

Aspect 34. The process defined in any one of the preceding aspects, wherein the activated (calcined) catalyst has a MI potential of at least 0.2, at least 0.3, at least 0.4, at least 0.5, at least 0.6, at least 0.7, at least 0.8, at least 0.9, at least 1, or at least 1.2 g/10 min.

Aspect 35. The process defined in any one of the preceding aspects, wherein the activated (calcined) catalyst has a HLMI potential of at least 20, at least 25, at least 30, at least 35, at least 40 at least 50, at least 60, at least 70, at least 80, or at least 100 g/10 min.

Aspect 36. The process defined in any one of the preceding aspects, wherein the activated (calcined) catalyst produces a polymer under standard polymerization conditions that has a total film gel count (or a catalyst particle gel count) of less than or equal to 100 gels per $ft^2$ of 25 micron thick film (or less than or equal to 80, or less than or equal to 60, or less than or equal to 40, or less than or equal to 30, or less than or equal to 20, or less than or equal to 10, or less than or equal to 8, or less than or equal to 5, gels per $ft^2$ of 25 micron thick film), wherein film gels encompass a size (diameter) greater than 200 μm (and caused by catalyst particles for the catalyst particle gel count).

Aspect 37. The process defined in any one of the preceding aspects, wherein the pre-catalyst (or the activated catalyst) is contacted with a gas stream at any suitable linear velocity or any linear velocity disclosed herein, e.g., from 0.05 to 0.6 ft/sec, from 0.05 to 0.3 ft/sec, from 0.1 to 0.4 ft/sec, from 0.2 to 0.5 ft/sec, from 0.2 to 0.4 ft/sec, or from 0.2 to 0.3 ft/sec, in a fluidized bed vessel (batch or continuous).

Aspect 38. An olefin polymerization process comprising (I) performing the process to produce the activated (calcined) chromium catalyst defined in any one of aspects 1-37; and (II) contacting the activated (calcined) chromium catalyst and an optional co-catalyst with an olefin monomer and an optional olefin comonomer in a polymerization reactor system under polymerization conditions to produce an olefin polymer.

Aspect 39. The olefin polymerization process defined in aspect 38, wherein a co-catalyst is used, and the co-catalyst comprises any suitable co-catalyst or any co-catalyst disclosed herein, e.g., an aluminoxane co-catalyst, an organoaluminum co-catalyst, an organoboron co-catalyst, or any combination thereof.

Aspect 40. The olefin polymerization process defined in aspect 38 or 39, wherein the olefin monomer and the optional olefin comonomer independently comprise a $C_2$-$C_{20}$ alpha-olefin.

Aspect 41. The olefin polymerization process defined in any one of aspects 38-40, wherein the olefin monomer comprises ethylene.

Aspect 42. The olefin polymerization process defined in any one of aspects 38-41, wherein the activated chromium catalyst is contacted with ethylene and an olefin comonomer comprising a $C_3$-$C_{10}$ alpha-olefin.

Aspect 43. The olefin polymerization process defined in any one of aspects 38-42, wherein the activated chromium catalyst is contacted with ethylene and an olefin comonomer comprising 1-butene, 1-hexene, 1-octene, or a mixture thereof.

Aspect 44. The olefin polymerization process defined in any one of aspects 38-43, wherein the polymerization reactor system comprises a slurry reactor, a gas-phase reactor, a solution reactor, or a combination thereof.

Aspect 45. The olefin polymerization process defined in any one of aspects 38-44, wherein the polymerization reactor system comprises a loop slurry reactor.

Aspect 46. The olefin polymerization process defined in any one of aspects 38-45, wherein the polymerization reactor system comprises a single reactor.

Aspect 47. The olefin polymerization process defined in any one of aspects 38-45, wherein the polymerization reactor system comprises 2 reactors.

Aspect 48. The olefin polymerization process defined in any one of aspects 38-45, wherein the polymerization reactor system comprises more than 2 reactors.

Aspect 49. The olefin polymerization process defined in any one of aspects 38-48, wherein the olefin polymer comprises any olefin polymer disclosed herein.

Aspect 50. The olefin polymerization process defined in any one of aspects 38-49, wherein the olefin polymer comprises an ethylene homopolymer, an ethylene/1-butene copolymer, an ethylene/1-hexene copolymer, and/or an ethylene/1-octene copolymer.

Aspect 51. The olefin polymerization process defined in any one of aspects 38-50, wherein the polymerization conditions comprise a polymerization reaction temperature in a range from 60° C. to 120° C. and a reaction pressure in a range from 200 to 1000 psig (1.4 to 6.9 MPa).

Aspect 52. The olefin polymerization process defined in any one of aspects 38-51 wherein the polymerization conditions are substantially constant, e.g., for a particular polymer grade.

Aspect 53. The olefin polymerization process defined in any one of aspects 38-52, wherein no hydrogen is added to the polymerization reactor system.

Aspect 54. The olefin polymerization process defined in any one of aspects 38-52, wherein hydrogen is added to the polymerization reactor system.

Aspect 55. The olefin polymerization process defined in any one of aspects 38-54, wherein the process is performed at a productivity of from 2000 to 5000 g polymer per gram of catalyst, and/or at a space-time yield of greater than or equal to 2, 2.5, 2.8, 3, or 4 (lb/hr)/gal and/or less than or equal to 6, 5.5, or 5 (lb/hr)/gal, in a commercial loop reactor making at least a 0.947 g/cc density ethylene/1-hexene copolymer as determined by ISO 1183 part 2.

Aspect 56. The olefin polymerization process defined in any one of aspects 38-55, wherein the process is performed at a productivity of from 2000 to 5000 g polymer per gram of catalyst, and/or at a space-time yield of greater than or equal to 2, 2.5, 2.8, 3, or 4 (lb/hr)/gal and/or less than or equal to 6, 5.5, or 5 (lb/hr)/gal, in a commercial loop reactor making at least a 0.938 g/cc density ethylene/1-hexene copolymer as determined by ISO 1183 part 2.

Aspect 57. The process defined in any one of the preceding aspects, wherein the pre-catalyst (or the silica support, or the activated chromium catalyst) has any suitable pore volume (total) or a pore volume (total) in any range disclosed herein, e.g., from 0.5 to 5 mL/g, from 1 to 5 mL/g, from 1 to 3 mL/g, or from 1.5 to 2 mL/g.

Aspect 58. The process defined in any one of the preceding aspects, wherein the pre-catalyst (or the silica support, or the activated chromium catalyst) has any suitable BET surface area or a BET surface area in any range disclosed herein, e.g., from 100 to 700 m$^2$/g, from 200 to 600 m$^2$/g, from 250 to 550 m$^2$/g, or from 300 to 500 m$^2$/g.

Aspect 59. The process defined in any one of the preceding aspects, wherein the pre-catalyst (or the silica support, or the activated chromium catalyst) has any suitable average (d50) particle size or an average (d50) particle size in any range disclosed herein, e.g., from 10 to 500 microns, from 30 to 130 microns, or from 40 to 70 microns.

Aspect 60. The process defined in any one of the preceding aspects, wherein the pre-catalyst (or the activated chromium catalyst) has any suitable amount of titanium or an amount in any range disclosed herein, e.g., from 0.5 to 10 wt. %, from 1 to 10 wt. %, from 2 to 8 wt. %, or from 2 to 6 wt. % of titanium, based on the weight of the respective catalyst.

Aspect 61. The process defined in any one of the preceding aspects, wherein the pre-catalyst (or the activated chromium catalyst) has any suitable amount of chromium or an amount in any range disclosed herein, e.g., from 0.1 to 4 wt. %, from 0.2 to 5 wt. %, from 0.5 to 3 wt. %, from 0.5 to 2 wt. %, or from 0.5 to 1.5 wt. % of chromium, based on the weight of the respective catalyst.

Aspect 62. The process defined in any one of the preceding aspects, wherein the pre-catalyst (or the activated chromium catalyst) has any suitable amount of nitrogen or an amount in any range disclosed herein, e.g., from 1 to 4.5, from 1.5 to 5, from 1.5 to 4.5, from 2 to 5, from 2 to 4, or from 2 to 3 mol nitrogen/mol titanium.

Aspect 63. The process defined in any one of the preceding aspects, wherein the pre-catalyst has any suitable amount of a carboxylate group/ligand or an amount in any range disclosed herein, e.g., from 1 to 5, from 1 to 4, from 1 to 3, from 1.5 to 5, from 1.5 to 4, or from 2 to 3 mol carboxylate/mol titanium.

Aspect 64. The process defined in any one of the preceding aspects, wherein the pre-catalyst has any suitable amount of carbon or an amount in any range disclosed herein, e.g., from 0.5 to 10 wt. %, from 1 to 10 wt. %, from 1 to 5 wt. %, from 2 to 10 wt. %, from 2 to 8 wt. %, or from 2 to 6 wt. % of carbon, based on the weight of the catalyst.

Aspect 65. The process defined in any one of the preceding aspects, wherein the amount of chromium of the pre-catalyst in an oxidation state of +5 or less is at least 50 wt. %, at least 60 wt. %, at least 70 wt. %, at least 80 wt. %, at least 90 wt. %, or at least 95 wt. %, based on the total amount of chromium on the pre-catalyst.

Aspect 66. The process defined in any one of the preceding aspects, wherein the amount of chromium of the activated chromium catalyst in a hexavalent oxidation state is at least 40 wt. %, at least 50 wt. %, at least 60 wt. %, at least 70 wt. %, at least 80 wt. %, at least 90 wt. %, or at least 95 wt. %, based on the total amount of chromium on the activated chromium catalyst.

Aspect 67. An olefin polymer (e.g., an ethylene polymer) produced by the olefin polymerization process defined in any one of aspects 38-66.

Aspect 68. An ethylene polymer having (or characterized by) a high load melt index (HLMI) in a range from 10 to 80 g/10 min; a density in a range from 0.93 to 0.96 g/cm$^3$; and a total film gel count (or a catalyst particle gel count) of less than or equal to 100 gels per ft$^2$ of 25 micron thick film (or less than or equal to 80, or less than or equal to 60, or less than or equal to 40, or less than or equal to 30, or less than or equal to 20, or less than or equal to 10, or less than or equal to 8, or less than or equal to 5, gels per ft$^2$ of 25 micron thick film), wherein film gels encompass a size (diameter) greater than 200 μm (and caused by catalyst particles for the catalyst particle gel count); wherein the ethylene polymer contains from 150 to 680 ppm silica, from 1.5 to 6.8 ppm chromium, and from 1.5 to 40 ppm titanium.

Aspect 69. An ethylene polymer having (or characterized by) a melt index (MI) in a range from 0.1 g/10 min to 1 g/10 min; a density in a range from 0.93 to 0.96 g/cm$^3$; and a total film gel count (or a catalyst particle gel count) of less than or equal to 100 gels per ft$^2$ of 25 micron thick film (or less than or equal to 80, or less than or equal to 60, or less than or equal to 40, or less than or equal to 30, or less than or equal to 20, or less than or equal to 10, or less than or equal to 8, or less than or equal to 5, gels per ft$^2$ of 25 micron thick film), wherein film gels encompass a size (diameter) greater than 200 µm (and caused by catalyst particles for the catalyst particle gel count); wherein the ethylene polymer contains from 150 to 680 ppm silica, from 1.5 to 6.8 ppm chromium, and from 1.5 to 40 ppm titanium.

Aspect 70. The polymer defined in any one of aspects 67-69, wherein the ethylene polymer has a HLMI in any range disclosed herein, e.g., from to 10 to 70, from 10 to 60, from 10 to 50, from 20 to 80, from 20 to 50, or from 30 to 50 g/10 min.

Aspect 71. The polymer defined in any one of aspects 67-70, wherein the ethylene polymer has a MI in any range disclosed herein, e.g., from 0.1 to 1, from 0.1 to 0.75, from 0.1 to 0.6, from 0.2 to 1, from 0.2 to 0.6, or from 0.3 to 0.6 g/10 min.

Aspect 72. The polymer defined in any one of aspects 67-71, wherein the ethylene polymer has a density in any range disclosed herein, e.g., from 0.93 to 0.956, from 0.934 to 0.96, from 0.934 to 0.956, from 0.934 to 0.95, or from 0.945 to 0.958 g/cm$^3$.

Aspect 73. The polymer defined in any one of aspects 67-72, wherein the ethylene polymer contains, independently, less than 0.1 ppm (by weight), less than 0.08 ppm, less than 0.05 ppm, or less than 0.03 ppm, of Mg, V, Zr, or Hf.

Aspect 74. The polymer defined in any one of aspects 67-73, wherein the ethylene polymer contains from 1.8 to 6 ppm, from 2 to 6.8 ppm, from 2 to 6 ppm, from 2 to 5 ppm, from 2 to 4.5 ppm, from 2 to 4 ppm, from 1.5 to 6 ppm, from 1.5 to 5.5 ppm, from 1.5 to 5 ppm, or from 3 to 6 ppm of chromium.

Aspect 75. The polymer defined in any one of aspects 67-74, wherein the ethylene polymer contains from 1.5 to 30 ppm, from 2 to 40 ppm, from 2 to 30 ppm, from 2 to 10 ppm, from 3 to 30 ppm, from 3 to 20 ppm, from 3 to 10 ppm, from 4 to 20 ppm, from 5 to 40 ppm, from 5 to 25 ppm, from 5 to 15 ppm, from 7 to 17 ppm, or from 8 to 16 ppm of titanium.

Aspect 76. The polymer defined in any one of aspects 67-75, wherein the ethylene polymer contains from 180 to 600 ppm, from 200 to 680 ppm, from 200 to 600 ppm, from 200 to 500 ppm, from 200 to 400, from 150 to 600 ppm, from 150 to 500 ppm, or from 150 to 450 ppm of silica.

Aspect 77. The polymer defined in any one of aspects 67-76, wherein the ethylene polymer has a Mn in any range disclosed herein, e.g., from 3,000 to 25,000, from 8,000 to 20,000, from 10,000 to 18,000, or from 12,000 to 15,000 g/mol.

Aspect 78. The polymer defined in any one of aspects 67-76, wherein the ethylene polymer has a Mw in any range disclosed herein, e.g., from 100,000 to 250,000, from 120,000 to 200,000, or from 140,000 to 180,000 g/mol.

Aspect 79. The polymer defined in any one of aspects 67-78, wherein the ethylene polymer has a Mz in any range disclosed herein, e.g., from 500,000 to 2,000,000, from 500,000 to 1,800,000, or from 600,000 to 1,500,000 g/mol.

Aspect 80. The polymer defined in any one of aspects 67-79, wherein the ethylene polymer has a ratio of Mw/Mn in any range disclosed herein, e.g., from 7 to 20, from 8 to 18, from 9 to 17, from 9 to 15, or from 10 to 14.

Aspect 81. The polymer defined in any one of aspects 67-80, wherein the ethylene polymer has a ratio of Mz/Mw in any range disclosed herein, e.g., from 5 to 10, from 5 to 9, from 6 to 10, or from 6 to 9.

Aspect 82. The polymer defined in any one of aspects 67-81, wherein the ethylene polymer has a CY-a parameter in any range disclosed herein, e.g., from 0.1 to 0.3, from 0.13 to 0.2, from 0.13 to 0.17, from 0.16 to 0.26, from 0.17 to 0.24, or from 0.18 to 0.22.

Aspect 83. The polymer defined in any one of aspects 67-82, wherein the ethylene polymer comprises an ethylene homopolymer and/or an ethylene/α-olefin copolymer.

Aspect 84. The polymer defined in any one of aspects 67-83, wherein the ethylene polymer comprises an ethylene homopolymer, an ethylene/1-butene copolymer, an ethylene/1-hexene copolymer, and/or an ethylene/1-octene copolymer.

Aspect 85. The polymer defined in any one of aspects 67-84, wherein the ethylene polymer comprises an ethylene/1-hexene copolymer.

Aspect 86. The polymer defined in any one of aspects 67-85 produced by the process defined in any one of aspects 38-66.

Aspect 87. An article comprising the ethylene polymer defined in any one of aspects 67-86.

Aspect 88. An article comprising the ethylene polymer defined in any one of aspects 67-86, wherein the article is an agricultural film, a geomembrane film, a packaging film, a pallet wrap film, an automobile part, a bottle, a container for chemicals, a drum, a fiber or fabric, a food packaging film or container, a food service article, a fuel tank, a geomembrane, a household container, a liner, a molded product, a medical device or material, an outdoor storage product, outdoor play equipment, a pipe, a sheet or tape, a toy, or a traffic barrier.

We claim:
1. An ethylene polymer having:
a melt index (MI) in a range from 0.1 to 1 g/10 min and/or a high load melt index (HLMI) in a range from 10 to 80 g/10 min;
a density in a range from 0.93 to 0.96 g/cm$^3$; and
a total film gel count of less than or equal to 40 gels per ft$^2$ of 25 micron thick film, wherein film gels encompass a size in diameter of greater than 200 µm;
wherein the ethylene polymer contains:
from 150 to 680 ppm silica;
from 1.5 to 6.8 ppm chromium; and
from 1.5 to 40 ppm titanium.

2. The polymer of claim 1, wherein the ethylene polymer has the MI in the range from 0.1 to 1 g/10 min.

3. The polymer of claim 1, wherein the ethylene polymer has the HLMI in the range from 10 to 80 g/10 min.

4. The polymer of claim 1, wherein the density is in a range from 0.93 to 0.956 g/cm$^3$.

5. The polymer of claim 1, wherein the total film gel count is less than or equal to 10 gels per ft$^2$ of 25 micron thick film.

6. The polymer of claim 1, wherein the ethylene polymer has a catalyst particle gel count of less than or equal to 10 gels per ft$^2$ of 25 micron thick film, wherein catalyst particle gels encompass a size in diameter of greater than 200 µm and are caused by catalyst particles.

7. The polymer of claim 1, wherein the ethylene polymer contains:
from 200 to 600 ppm of silica; or
from 2 to 6 ppm of chromium; or
from 3 to 30 ppm of titanium; or
any combination thereof.

8. The polymer of claim 1, wherein the ethylene polymer contains, independently, less than 0.1 ppm by weight of Mg, V, Zr, or Hf.

9. The polymer of claim 1, wherein the ethylene polymer comprises an ethylene homopolymer, an ethylene/1-butene copolymer, an ethylene/1-hexene copolymer, and/or an ethylene/1-octene copolymer.

10. The polymer of claim 1, wherein the ethylene polymer has:
the MI in a range from 0.1 to 0.75 g/10 min; and
the HLMI in a range from 20 to 50 g/10 min.

11. The polymer of claim 10, wherein the ethylene polymer is further characterized by:
a Mn in a range from 3,000 to 25,000 g/mol;
a Mw in a range from 100,000 to 250,000 g/mol; and
a Mz in a range from 500,000 to 2,000,000 g/mol.

12. The polymer of claim 11, wherein the ethylene polymer is further characterized by a CY-a parameter in a range from 0.13 to 0.2.

13. The polymer of claim 10, wherein the ethylene polymer is further characterized by:
a ratio of Mw/Mn in a range from 7 to 20; and
a ratio of Mz/Mw in a range from 5 to 10.

14. The polymer of claim 1, wherein the ethylene polymer contains:
from 200 to 600 ppm of silica;
from 2 to 6 ppm of chromium; and
from 3 to 30 ppm of titanium.

15. The polymer of claim 14, wherein the ethylene polymer is further characterized by:
a Mn in a range from 10,000 to 18,000 g/mol;
a Mw in a range from 140,000 to 180,000 g/mol; and
a Mz in a range from 600,000 to 1,500,000 g/mol.

16. The polymer of claim 15, wherein the ethylene polymer is further characterized by a CY-a parameter in a range from 0.13 to 0.17.

17. The polymer of claim 14, wherein the ethylene polymer is further characterized by:
a ratio of Mw/Mn in a range from 9 to 15; and
a ratio of Mz/Mw in a range from 5 to 9.

18. The polymer of claim 1, wherein the ethylene polymer contains:
from 200 to 400 ppm of silica;
from 2 to 5 ppm of chromium; and
from 7 to 17 ppm of titanium.

19. The polymer of claim 18, wherein the ethylene polymer has:
the MI in a range from 0.1 to 0.75 g/10 min; and
the HLMI in a range from 20 to 50 g/10 min.

20. The polymer of claim 19, wherein the total film gel count is less than or equal to 20 gels per $ft^2$ of 25 micron thick film.

21. An article of manufacture comprising the polymer of claim 1.

* * * * *